United States Patent [19]
Broell et al.

[11] Patent Number: 5,710,506
[45] Date of Patent: Jan. 20, 1998

[54] LEAD ACID CHARGER

[75] Inventors: Frederick Gaudenz Broell, Plano; Jehangir Parvereshi; Stephen Paul Sacarisen, both of Carrollton, all of Tex.

[73] Assignee: Benchmarq Microelectronics, Inc., Dallas, Tex.

[21] Appl. No.: 385,537

[22] Filed: Feb. 7, 1995

[51] Int. Cl.⁶ .............................. H02J 7/10; H01M 10/44
[52] U.S. Cl. ................................................ 320/522; 320/23
[58] Field of Search .................................. 320/21, 22, 23, 320/24, 20

[56] References Cited

U.S. PATENT DOCUMENTS

| | | |
|---|---|---|
| 4,371,826 | 2/1983 | Shelly . |
| 4,388,582 | 6/1983 | Saar et al. . |
| 4,433,277 | 2/1984 | Carollo et al. ........................... 320/24 |
| 4,472,672 | 9/1984 | Pacholok . |
| 4,491,768 | 1/1985 | Slicker . |
| 4,503,378 | 3/1985 | Jones et al. ............................... 320/20 |
| 4,584,514 | 4/1986 | Kaminski . |
| 4,607,208 | 8/1986 | Vreeland . |
| 4,638,236 | 1/1987 | Carr et al. . |
| 4,792,743 | 12/1988 | Tsujino et al. ......................... 320/22 X |
| 4,829,259 | 5/1989 | Konopka . |
| 4,855,663 | 8/1989 | Matsui et al. ......................... 320/21 X |
| 4,862,013 | 8/1989 | Konopka . |
| 4,876,495 | 10/1989 | Palanisamy et al. . |

(List continued on next page.)

FOREIGN PATENT DOCUMENTS

| | | |
|---|---|---|
| 0 629 021 A1 | 12/1994 | European Pat. Off. . |
| 2248735 | 4/1992 | United Kingdom . |
| 2290426 | 12/1995 | United Kingdom . |

OTHER PUBLICATIONS

"Charging the New Batteries—IC Controllers Track New Technologies", Robert A. Mammano, Unitrode IC Corp., Merrimac, NH 03054.

"Simple Switchmode Lead–Acid Battery Charger", John A. O'Connor, Unitrode Integrated Circuits, Merrimack, NH, Power Conversion, Sep. 1991 Proceedings.

"Sealed Lead–Acid Battery Charger", Unitrode Integrated Circuits, pp. 292–298, Jun. 1993.

"Charge Batteries Safely in 15 Minutes by Detecting Voltage Inflection Points", Design Feature, Sep. 1, 1994, Gary Cummings, Spectra Research, Daniel Brotton, Black & Decker Corp., and James Goodhart, Zilog, Inc.

*Primary Examiner*—Peter S. Wong
*Assistant Examiner*—Patrick B. Law
*Attorney, Agent, or Firm*—Gregory M. Howison

[57] ABSTRACT

A battery charge controller (50) is provided which includes a PWM switch controller (36) that is operable to control a switching regulator to supply current to a battery (10) in either a current regulation mode or a voltage regulation mode. A charge control (40) is operable to control the charging operation such that multiple modes of operation are selectable by an external programmable pin. The three modes provided are: a constant voltage mode, a dual-current mode and a pulse-current mode. The constant voltage mode provides for a conditioning state followed by a bulk charging state followed by a maintenance state. In the bulk charging state, current regulation is provided at a maximum current until a charged condition occurs, at which time the charger is placed in a voltage regulation mode. In the dual-current mode, the system is switched between two current regulation levels, a high current regulation level for fast charging to a substantially fully charged state of around eighty percent of rated full charge after which a low current pulsed operation is maintained during a maintenance mode. In the pulsed-current mode, current regulation is performed at the maximum current until the substantially full charged state is detected, after which the cell voltage is allowed to float until it falls below a nominal cell voltage, at which time rapid charging is again performed at a current regulated level. In this last mode, a substantially fully charged state is determined by examining the gradient of the voltage change of the charging profile to determine when a sustained negative value occurs, this indicating the onset of an increase in the pressure and temperature of the cell.

27 Claims, 16 Drawing Sheets

U.S. PATENT DOCUMENTS

| | | | |
|---|---|---|---|
| 5,166,595 | 11/1992 | Leverich | 320/21 X |
| 5,172,784 | 12/1992 | Varela, Jr. | |
| 5,180,961 | 1/1993 | Tsujino | 320/20 |
| 5,192,905 | 3/1993 | Karlin et al. | |
| 5,198,743 | 3/1993 | McClure et al. | |
| 5,250,891 | 10/1993 | Glasgow | |
| 5,254,932 | 10/1993 | Bittar et al. | |
| 5,270,636 | 12/1993 | Lafferty | |
| 5,296,797 | 3/1994 | Bartlett | |
| 5,321,349 | 6/1994 | Chang | |
| 5,432,426 | 7/1995 | Yoshida | 320/20 |
| 5,449,997 | 9/1995 | Gilmore et al. | |
| 5,469,043 | 11/1995 | Cherng et al. | 320/31 |
| 5,475,294 | 12/1995 | Isoda | 320/22 X |
| 5,477,125 | 12/1995 | Ettel et al. | 320/20 |

LEAD ACID CHARGER

BACKGROUND OF THE INVENTION

The consumer and industrial markets have seen increased demand for battery management technology, primarily due to the consumers' ever-increasing appetite for the convenience of battery-powered portable equipment such as cellular phones and laptop computers. Additionally, the industrial market is seeing a movement toward an increased emphasis on electric motor-driven tools and vehicles due to the ever-increasing governmental regulations and consumer concerns on environmental pollution, the primary power source for this equipment being batteries.

As a result of this increased use of battery-powered equipment, the battery industry itself is under competitive pressure to produce a cell that weighs almost nothing, takes up no space and has ideal charge/discharge performance. The technology utilized by the battery industry includes lead-acid chemistries which are being challenged to meet the lighter weight, smaller size and higher performance requirements. The technology for manufacturing lead-acid batteries is being improved but the rate of the improvements is not keeping up with the consumers' appetite. One aspect of utilizing these batteries that has not been addressed adequately is that of the battery charger itself.

Lead-acid battery chargers typically have two tasks to accomplish. The first is to restore capacity, often as quickly as practical, and the second is to maintain capacity by compensating for self-discharge. In both instances, optimal operation requires accurate sensing of battery voltage and temperature. When a typical lead-acid cell is charged, a lead sulfate is converted to lead on the battery's negative plate and lead dioxide on the positive plate. Over-charge reactions begin when the majority of lead sulfate has been converted, typically resulting in the formation of hydrogen and oxygen gas, this referred to as "outgassing". At moderate charge rates, most of the hydrogen and oxygen will recombine in sealed batteries. In unsealed batteries, however, dehydration will occur.

The onset of over-charge can be detected by monitoring battery voltage. Over-charge reactions are indicated by a sharp rise in the cell's voltage. The point at which over-charge reactions begin is dependent on charge rate, and as charge rate is increased, the percent of return capacity at the onset of over-charge diminishes. At high charge rates, controlled over-charging is typically employed with sealed batteries to return to full capacity as soon as possible.

Previous solutions to the problem of quickly charging lead-acid batteries have utilized multiple modes of operation. In one technique, a first mode is a conditioning mode. In the conditioning mode, a small current is applied to raise the battery voltage up to a level corresponding to a zero percent state of charge, this condition being utilized when the battery voltage is below a predetermined threshold, indicative of a very deep discharge or one or more shorted cells. Charging in this mode at low battery voltages prevents the charger from delivering high currents into an electrical short, as well as reducing excessive out-gassing when a shorted cell is present.

In the second mode of operation, referred to as the "bulk-charge" mode, the voltage is monitored, and when it exceeds the trickle-charge threshold, the charger transitions into a bulk-charge state, during which full-time current is delivered to the battery. During this bulk-charge state, the majority of the battery capacity is restored. In a third mode, an over-charge mode, a controlled over-charging operation is performed. This is operable to restore full capacity in a minimum amount of time. The over-charge voltage is dependent on the bulk-charge rate and, as an over-charge voltage is held constant, the charge current is diminished. Over-charge is terminated when the current reduces to a low value, typically one-tenth of the bulk-charge rate.

In a fourth mode, a float-charge mode, a fixed voltage is applied to the battery. In this mode, the charger will deliver whatever current is necessary to sustain a "float" voltage and compensate for leakage current. When a load is applied to the battery, the charger will supply the majority of the battery current up to the bulk-charge current level. It will remain in the float state until the battery voltage drops to approximately 90% of the value of the float voltage, at which point operation will revert to a different mode.

SUMMARY OF THE INVENTION

The current invention disclosed and claimed herein comprises a method and apparatus for controlling a charging operation of a lead acid battery. A charging device is provided having an input connected to an external power supply source and an output connected to the positive terminal of the battery and controllable to determine the amount of charge input to the battery. A control system is provided for controlling the charging device during a charging operation, at least a portion of the charging operation being a fast charge operation. A voltage monitor is provided for monitoring the voltage across the battery. A gradient determination device determines when a change in battery voltage determined by the battery voltage monitor as a function of time decreases during at least the fast charge operation by a predetermined amount and then generate a charge modification command in response thereto. A charge modification device then alters the operation of the charging device in response to generation of the charge modification command.

In another aspect of the present invention, the gradient determination device is operable to determine when the slope of the change in voltage in the battery is negative for a predetermined accumulated voltage value with no positive change during the predetermined accumulated voltage value determination. The charge modification command is generated in response to the change exceeding the predetermined accumulating voltage value.

In yet another aspect of the present invention, the charging device comprises a switching regulator circuit. A voltage regulator control is provided for controlling the switching regulator circuit to provide current to the battery at a predetermined regulated voltage. A current regulator control is provided for controlling the switching regulator circuit to provide a regulated current to the battery. A state machine controls the operation of the charge control circuit by selecting either the voltage regulator control or the current regulator control to control the switching regulator circuit in accordance with a predetermined charge profile. The predetermined charge profile defines the operation of the charging device as a function of current and voltage.

In a further aspect of the present invention, the predetermined charging profile comprises a conditioning state, a fast charge state and a maintenance state. In one profile, the conditioning state comprises a battery presence detector for determining if current is flowing to the battery during the conditioning state. If not, this is a fail state. If so, the current regulator control is selected and the current regulated to a conditioning current. When the voltage of the battery cell exceeds a predetermined minimum cell voltage, the operation of the system is switched to the fast charge state. In the fast charge state, the current regulator control is selected for regulating the current to a maximum current value. When the cell voltage has exceeded a predetermined bulk voltage value, the voltage regulator control is then selected for regulating the voltage to the bulk voltage value. When the current to the battery falls below a predetermined minimum current, the system switches to the maintenance state.

In a yet further aspect of the invention, after the conditioning state, the current is regulated to a predetermined maximum current and, when the charge modification command has been generated, switches to an inhibit or maintenance state wherein the voltage is allowed to "float" and remain in that state until the voltage has fallen below a predetermined float voltage level. Upon falling below the float voltage level, the current regulator control is then selected for again regulating the current to the battery at the maximum current level.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
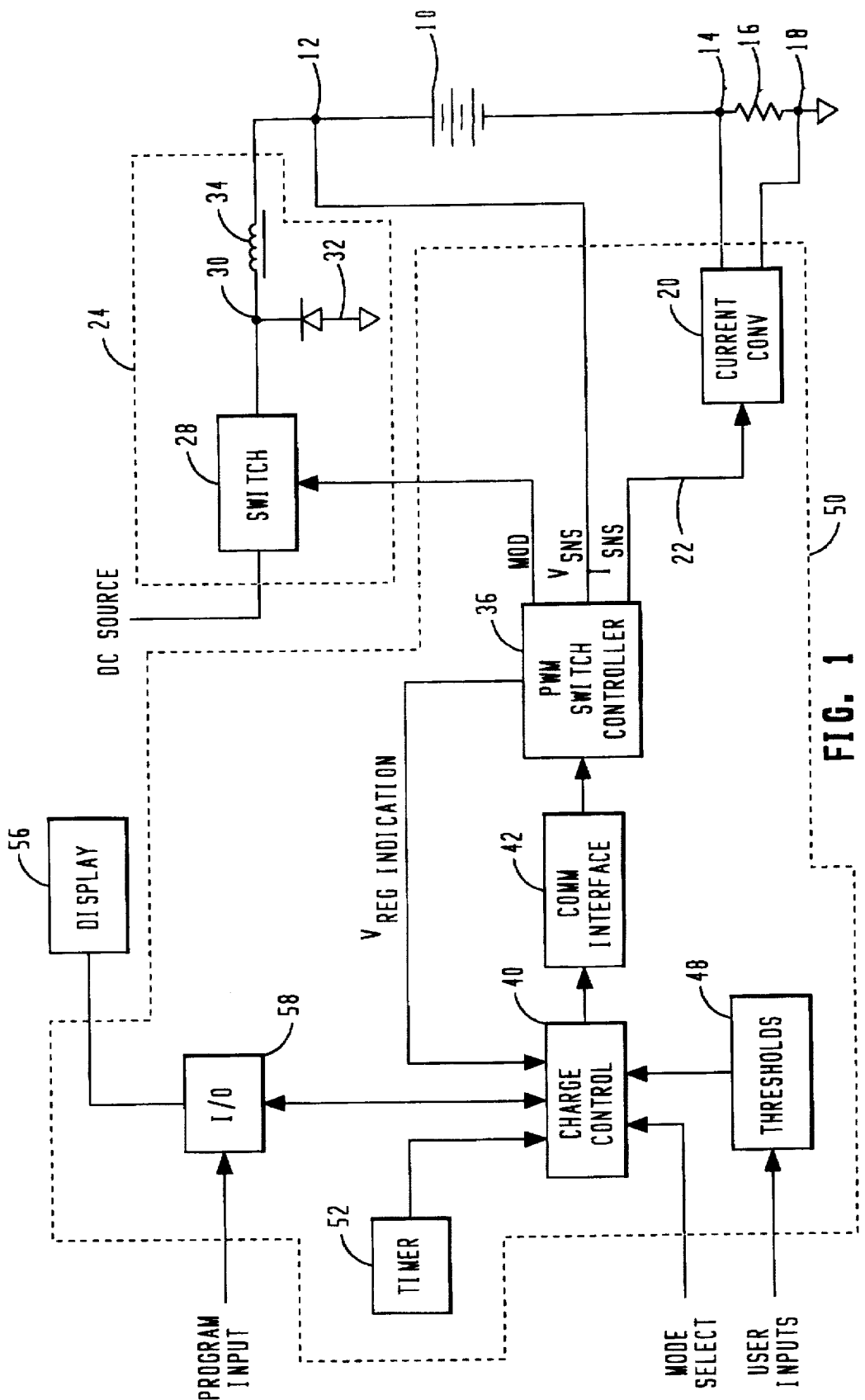
FIG. 1 illustrates an overall block diagram of the lead-acid battery charger.

Referring now to FIG. 1, there is illustrated an overall block diagram of the battery charger of the present invention. The battery charger is utilized to charge a lead-acid battery 10 having a positive terminal 12 and a negative terminal 14. A sense resistor 16 is disposed between the negative terminal of the battery 14 and a ground node 18. The sense resistor 16 is utilized to develop a voltage that is proportional to the current through the battery 10. This voltage is processed by a current converter circuit 20 to provide on the output thereof a sense current $I_{SNS}$ on a line 22. The current supplied to the node 12 for the purpose of charging is developed through a switching power supply circuit 24. The switching power supply circuit 24 is a conventional switching power supply which is comprised of a gate element 28, referred to as a "switch," which receives on the input thereof a DC voltage with the output thereof connected to a terminal 30. The terminal 30 is connected to the cathode of a switching diode 32, the anode thereof connected to ground. The node 30 is also connected to one side of a switching inductor 34, the other side thereof connected to the node 12. The switch 28 is controlled by a pulse width modulation (PWM) switch controller block 36. As will be described hereinbelow, the switch controller 36 is operable to control the switching power supply 24 to operate in a voltage regulation mode or a current regulation mode to either supply a constant current or a constant voltage to the node 12.

The overall operation of the power supply controller is controlled by a charge control circuit 40 which is operable to generate the necessary controls to control the switch controller 36. The signals generated by the charge control 40 are processed by communication interface device 42 before input to the switched controller 36. This communication interface 42 provides loop control to operate within a current loop to provide current regulation, and a voltage loop to provide voltage regulation, respectively. Various thresholds are provided by which the switching between current and voltage regulation is defined. These are stored in a block 48 and they are input by the user. Further, there are a number of different modes of operation which are selected external to the integrated circuit, the integrated circuit generally defined by a phantom outline 50. An internal timer 52 provides various timing controls to allow for "time outs" within which to terminate certain charging operations to prevent overcharging. The charge control 40 is also operable to generate display information for output by a display 56, this processed by input/output device 58. Additionally, the various program inputs can be received, one of which is the mode select input DSEL which is illustrated on the different inputs/outputs. As will be described hereinbelow, common pins are provided for the display 56, which display is comprised of light emitting diodes (LEDs). The common pins can be utilized for programming via predetermined input parameters or for outputting drive signals to LEDs, such that the pin performs an input/output function.

Figure 2:
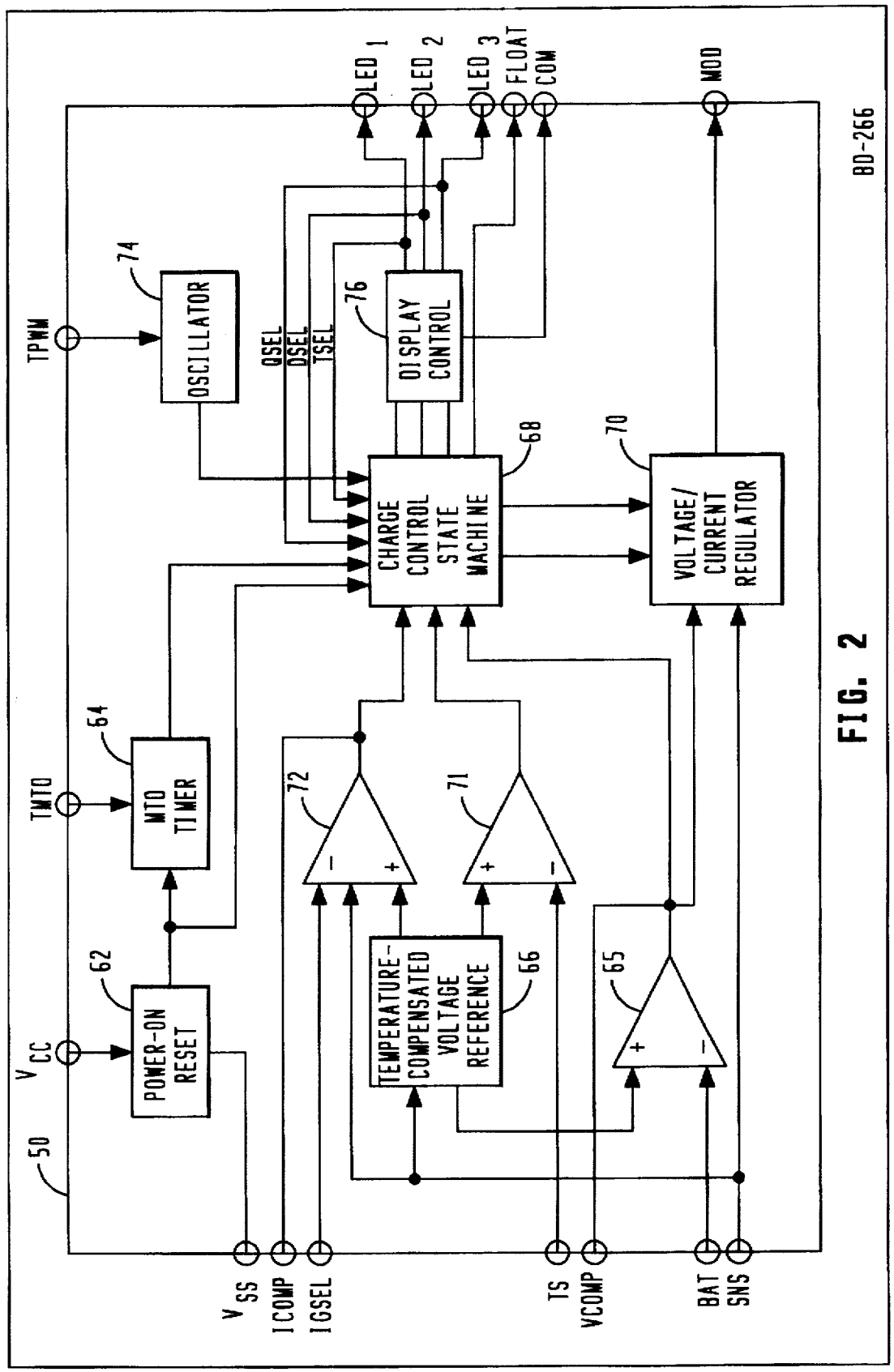
FIG. 2 illustrates a more detailed block diagram of the integrated circuit chip for implementing the lead-acid charger.

Referring now to FIG. 2, there is illustrated a more detailed block diagram of the integrated circuit 50. There are a number of pins that are provided on the integrated circuit 50, these being defined as follows:

| | |
|---|---|
| TMTO | Time-out timebase input<br>Timebase for maximum time-out charge termination. |
| FLOAT | State control output<br>Open-drain output for external resistor divider network connection to control the BAT input voltage threshold for the float charge state. |
| BAT | Single-cell voltage input<br>Single-cell voltage for the battery pack. Resistor divider network connected between the positive and the negative terminals of the battery. |
| VCOMP | Compensation output<br>External capacitor for voltage loop stability. |
| IGSEL | Current gain select<br>External resistor connection to set $I_{MIN}$. |
| ICOMP | Current compensation output<br>External capacitor for current loop stability. |
| SNS | Charging current sense input<br>SNS controls the switching of MOD based on an external sense resistor. |
| TS | Temperature sense input<br>Input for external battery temperature monitoring thermistor or probe. The external resistor and thermistor divider network is set for the lower and upper temperature threshold limits. |
| TPWM | Regulation timebase input<br>External timing capacitor sets the pulse-width modulation (PWM) frequency. |
| COM | Common LED output<br>Common output for $LED_{1-3}$. Output is high impedance during initiation to read soft-program input. |
| QSEL | Charge regulation select input<br>Soft-programmed three-level input selects constant-voltage or constant-current regulation mode. |
| MOD | Current-switching control output<br>MOD is a push/pull output that is used to control the charging current to the battery. MOD switches high to enable current flow and low to inhibit current flow. |
| $LED_{1-3}$ | Charger display status 1-3 outputs<br>Charger status output drivers for direct drive of LED displays. |
| DSEL | Display select<br>Soft-programmed three-level input controls and the $LED_{1-3}$ charge display modes. |
| TSEL | Termination select<br>Soft-programmed input controls constant-current bulk charge termination. |
| $V_{CC}$ | $V_{CC}$ supply input<br>5.0 V ± 10% power input |
| $V_{SS}$ | Ground |

The $V_{CC}$ input is connected to the circuit and processed through a power-on reset circuit 62 which is operable to control various functions of the chip upon power-up. One of these, as will be described hereinbelow, is to read the soft programming inputs on the display output pins $LED_1$, $LED_2$ and $LED_3$. This is input to a maximum time-out (MTO) timer circuit 64, which is then input to an overall charge control state machine 68, which controls the operation of the entire chip. This is then operable to control a voltage/current regulation circuit 70 which generates the modulation output signal MOD. This receives a time base from an oscillator circuit 74, and is connected to the TPWM output which is connected to an external timing capacitor which sets the pulse width modulation (PWM) frequency. The voltage/current regulator circuit 70 has one input connected to the sense input from the negative terminal of the battery 14 and also to the compensation input VCOMP, which is an external capacitor utilized to control the voltage loop stability. The battery voltage is input to the negative input of a comparator, the positive input thereof connected to the output of a temperature compensated voltage reference circuit 66, which is a bandgap generator. This is a conventional voltage reference circuit. The output of the comparator 65 is connected to the other input of the voltage/current regulator 70 and also to the VCOMP pin. The temperature sense input pin (TS) is connected to the negative input of a comparator 71, the positive input connected to the output of the voltage reference 66. Similarly, the current gain select pin (IGSEL) is connected to the negative input of the comparator 72, the positive input connected to the voltage reference 66. The output of the comparator 72 is input to the state machine 68, as well as the output of comparator 71. Additionally, the sense input (SNS) is connected to an input of the comparator 72. The state machine 68 generates the float signal FLOAT and also generates control signals for input a display control block 76. The display control 76 provides drive outputs for the pins $LED_1$, $LED_2$ and $LED_3$. Display control 76 is connected to the COM pin such that the LEDs can be connected therebetween. During power-on reset, the COM pin is open such that no drive current is provided to the LEDs. In this mode, external program resistors can either be connected high, allowed to float or connected low to provide the three soft program inputs TSEL, DSEL and QSEL. These are input to the charge control state machines 68.

The integrated circuit 50 is generally a monolithic CMOS IC that is designed to optimize charging of lead-acid chemistry batteries. The external controls allow for flexible pulse-width modulation regulation control to control both the constant-voltage and constant-current modes of charging. The regulator frequencies are set by external components to offer flexibility to control RFI. The charging action begins on application of power or battery replacement. The controller 68 allows for automatic sequences through several charge states based on the battery voltage and current charging conditions as described hereinbelow.

The charge control device provides for various charge action states which range from charge initiation to charge maintenance. They typically undergo a charge conditioning state, followed by a Bulk charge state and then followed by a maintenance state. The various conditions are described and summarized in Table 1.

TABLE 1

| CHARGER OPERATIONAL SUMMARY | | |
|---|---|---|
| Charge Action State | Conditions | MOD Output |
| Charge initiation | $V_{CC}$ applied, $V_{CELL}$ increases > 0.8 V | Low |
| Conditioning 1 | Charge initiation and $V_{HTF} < V_{TEMP} < V_{LTF}$ and if $V_{CELL} < V_{MIN}$; $V_{CELL} = V_{FLT} + 0.250$ V if $I_{SNS} < I_{COND}$ and 0.02 * MTO; conditioning MTO fault | Voltage regulation |
| Conditioning 2 | Conditioning 1 completed and $V_{HTF} < V_{TEMP} < V_{LTF}$ and if $I_{SNS} \geq I_{COND}$; $I_{SNS} = I_{COND}$ if $V_{CELL} < V_{MIN}$ and 0.16 * MTO; conditioning MTO fault | Current regulation |

TABLE 1-continued

CHARGER OPERATIONAL SUMMARY

| Charge Action State | Conditions | MOD Output |
|---|---|---|
| Charge pending | Charge initiation and $V_{TEMP} < V_{HTF}$ or $V_{TEMP} > V_{LTF}$ | Low |
| Bulk charging | Charge pending and conditioning 2 completed and $V_{MIN} < V_{CELL} < V_{MCV}$ and if $V_{CELL} < V_{BLK}$; $I_{SNS} = I_{MAX}$ or if QSEL = 1 and TSEL = 1; $V_{CELL} < V_{BLK}$ and $\Delta^2 V/\Delta t^2 > 0$; $I_{SNS} = I_{MAX}$ | Current regulation |
| Top-off charging | Bulk charging completed and $V_{HTF} < V_{TEMP} < V_{LTF}$ and $V_{MIN} < V_{CELL} V_{MCV}$ and if QSEL = 0; $I_{SNS} > I_{MIN}$; $V_{CELL} = V_{BLK}$ | Voltage regulation |
| Charge completion | Bulk and top-off charging completed and maximum time-out (MTO) and $V_{MIN} < V_{CELL} < V_{MCV}$ or maximum cut-off voltage (MCV) or if QSEL = 0; $I_{SNS} \leq I_{MIN}$ or if QSEL = 1; $V_{CELL} \geq V_{BLK}$ or $\Delta^2 V/\Delta t^2 < 0$ | Low |
| Charge maintenance | Charge completion and $V_{HTF} < V_{TEMP} < V_{LTF}$ and $V_{MIN} < V_{CELL} < V_{MCV}$ and if QSEL = 0; $V_{CELL} = V_{FLT}$ | Voltage regulation |
| Charge maintenance | Charge completion and $V_{HTF} < V_{TEMP} < V_{LTF}$ and $V_{MIN} < V_{CELL} < V_{MCV}$ and if QSEL = 1 and TSEL = 1; set $I_{SNS} = 0$ if $V_{CELL} \leq V_{FLT}$, go to bulk charging | Low |
| Charge maintenance | Charge completion and $V_{HTF} < V_{TEMP} < V_{LTF}$ and $V_{MIN} < V_{CELL} < V_{MCV}$ and if QSEL = 1 and TSEL = 0; $I_{SNS} = I_{MIN}$ | Current regulation |

NOTE: $1 = V_{CC}$, $0 = V_{SS}$.

These charge action states are identified to define three charging modes, a constant-voltage mode, a constant-current mode and a constant-current pulse mode. These modes are selected by the program status of the program input QSEL and TSEL. QSEL is a two-level soft-programmed input pin that sets the charge mode, and soft-programmed input pin TSEL selects the bulk-charge termination method and the charge maintenance action. In all charge modes, the charge controller automatically resets to the conditioning 1 state when the cell voltage $V_{CELL}$ is less than the minimum voltage $V_{MIN}$, such as a deep discharge load condition. A summary of the charge action control is provided in Table 2.

Figure 3:
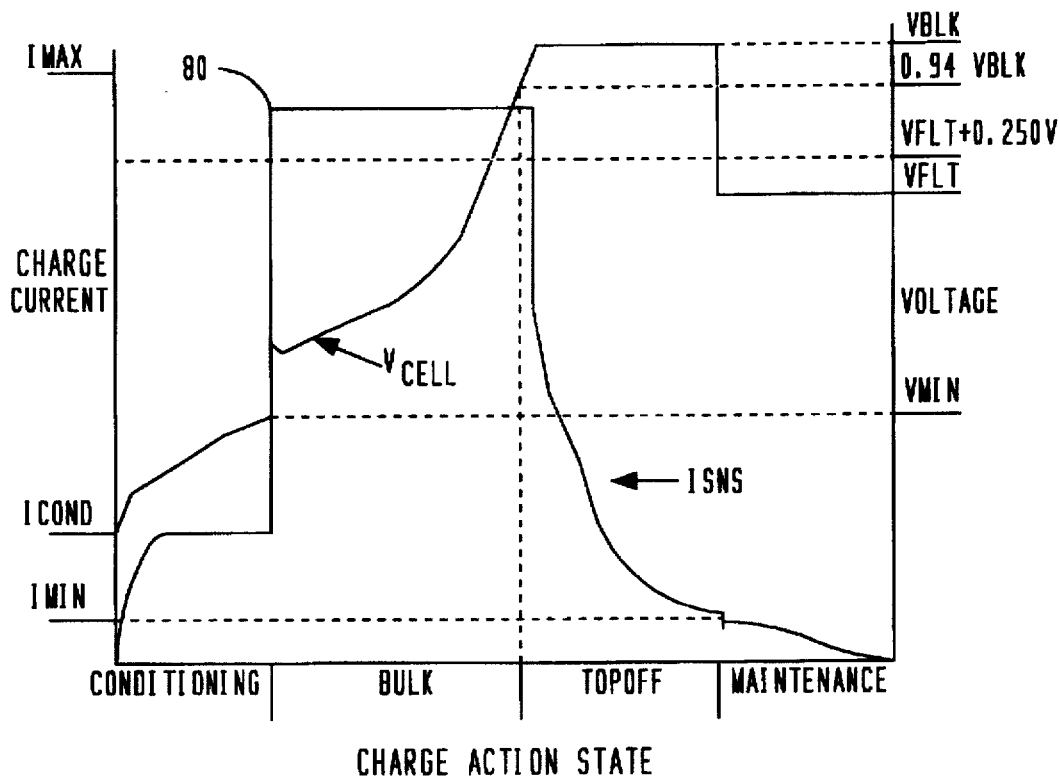
FIG. 3 illustrates a charging profile for the constant-voltage mode.
Figure 3A:
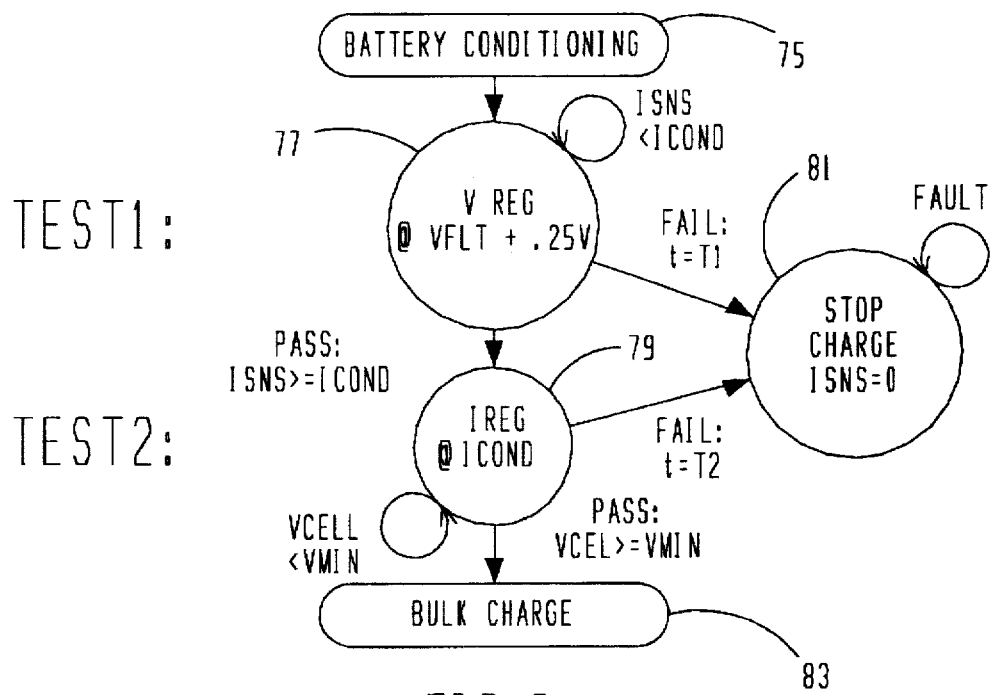
FIG. 3a illustrates a state diagram for the conditioning mode.

The algorithm for the conditioning state illustrated in FIG. 3a is an industry-standard test procedure for charge acceptance, the "Surface Vehicle Standard," SAE International, J537, Rev. June 1992. The state diagram is initiated at a block 75 and the first test procedure performed, as indicated at a state 77. In the first test procedure, a constant voltage is applied for a time period T1. If the cell current during this period is greater than or equal to a minimum threshold current, $I_{COND}$, then the state diagram flows to a state 79 to perform the second test. If not, then a fault condition is indicated and the state diagram flows to a state 81 to stop the charging operation. Typically, the current $I_{COND}$ is twenty-five percent of a maximum current $I_{MAX}$

TABLE 2

Charge Action Control Summary

| Charger Mode | QSEL | TSEL | Bulk Charge Termination | Top-off Charge Termination | Charge Maintenance Action |
|---|---|---|---|---|---|
| Constant voltage | 0 | X | $V_{BLK}$/MTO | $I_{MIN}$/MTO | Voltage regulation at $V_{FLT}$ |
| Constant current pulsed | 1 | 1 | $V_{BLK}/\Delta^2 V/\Delta t^2$/MTO | — | Pulsed current regulation at $I_{MAX}$ |
| Constant current | 1 | 0 | $V_{BLK}/\Delta^2 V/\Delta t^2$/MTO | — | Pulsed current regulation at $I_{MIN}$ |

Referring now to FIG. 3, there is illustrated a charging profile for the constant-voltage mode which is selected when QSEL is at a ground state or logic "0" with TSEL not being determinate of this charge mode, it being at either level. It can be seen that there is a conditioning state, a bulk state and a maintenance state, the bulk state indicated by the term "Bulk" and "Top-off". Both of these states indicate the overall bulk state. Two curves are shown, one for the voltage of the battery cell and the other for the charge current. The state diagram for the conditioning state is illustrated in FIG. 3a.

that can be input to the battery. This is a programmable input by the user. The first test procedure tests for the presence of the battery.

In the second test procedure, a constant current is input to the battery for a time period T2. If the cell voltage is greater than or equal to a minimum cell voltage, $V_{MIN}$, during this time period T2, then the state diagram proceeds to the next state 83 to initiate the Bulk charge operation. If not, then the state diagram proceeds to the state 81 to indicate a fault.

When the transition from the conditioning state to the Bulk state occurs, there is a slight hold-off period during this time to prevent any unwanted voltage pulses to affect any decisions when the current changes. At this point, indicated by a reference numeral 80, the current is changed from $I_{COND}$ to $I_{MAX}$ and the system maintained in the current regulation mode. This is a regulated current that is maintained until the cell voltage has risen to a level of $V_{BLK}$. However, if the voltage does not rise to the level of $V_{BLK}$, then a time-out will occur which is defined by the MTO timer 64 which will count a predetermined number of clock cycles and then roll over. At the end of this count cycle, the bulk state will change over to the top-off state if the cell voltage has not reached a value of $V_{BLK}$.

If the cell voltage has reached the value of $V_{BLK}$ prior to the time-out period of the MTO timer 64, the system will then be switched to the top-off state which will be a voltage regulation mode and the voltage will be regulated up to a voltage of $V_{BLK}$. This is a programmable input voltage. This state will continue until one of two conditions occurs. The first condition is that the current decreases to a value less than a threshold current $I_{MIN}$. The current level of $I_{MIN}$ is programmable by the user and can be set to one-tenth, one-twentieth or one-fortieth of the current $I_{MAX}$. The second condition is the time-out period of the MTO timer 64. If either of these conditions occurs, the voltage level of the voltage regulation operation is changed to $V_{FLT}$, which is a float voltage. This constitutes a maintenance mode.

The advantage of the constant-voltage mode is that the battery self-regulates the amount of current depending on the state of charge and all voltages are temperature compensated. The constant-voltage mode can be used in both cyclic and float applications to control rapid charging at an elevated level and then step down to the temperature-compensated float voltage.

Figure 4:
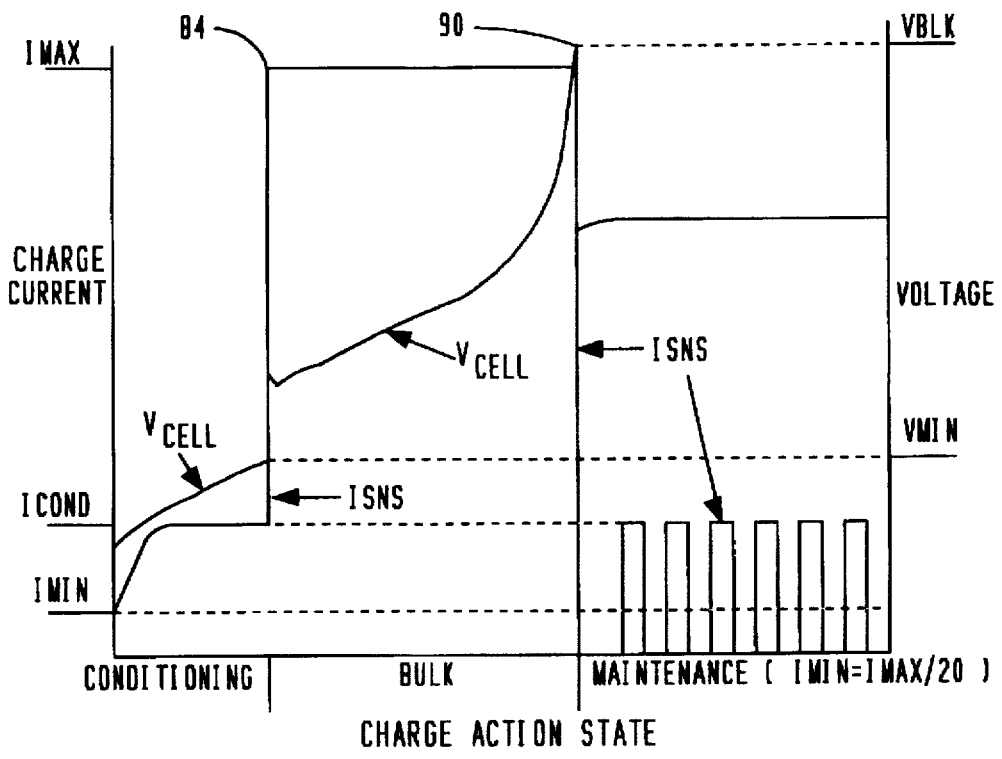
FIG. 4 illustrates a charging profile for the constant-current mode.

Referring now to FIG. 4, there is illustrated a charging profile for the constant-current mode. In the constant-current mode, a dual level current regulation scheme is utilized with no voltage regulation. The first charge action state is a conditioning state, the second state is a bulk state and the third state is a maintenance state. In the conditioning state, charge is input into the battery similar to the conditioning state of the constant-voltage mode. At this point, indicated by a reference numeral 84, the system enters into a current regulation mode at a current of $I_{MAX}$. This is maintained until the cell voltage $V_{CELL}$ reaches a fully charged condition, at which time the voltage charging operation is terminated. Of course, if the time-out period has occurred, the bulk-charge state is also terminated. The fully charged condition is indicated whenever the voltage exceeds the voltage $V_{BLK}$ or the gradient of the change in voltage exceeds a predetermined level. This gradient of the change method is an overcharge detect method which will be described in much more detail hereinbelow.

In the maintenance portion of the charge action state at point 90, the current is maintained at the $I_{COND}$ current and the current is then modulated on and off at a predetermined duty cycle. The current level of the regulation is set to $I_{COND}$ during the "on" time. The duty cycle is defined by the programmed level of $I_{MIN}$, such that the average current provided in the maintenance state is $I_{MIN}$. This is achieved with the IGSEL input.

As described above, this fully charged state is determined by either the cell voltage reaching the $V_{BLK}$ voltage or the gradient of the voltage change being determined as being the decision-making factor. Alternatively, the decision from bulk to maintenance state can occur as a result of time-out, i.e., when the full count time of the MTO timer 64 has occurred prior to the voltage reaching $V_{BLK}$, it being noted that $V_{BLK}$ does not necessarily indicate a fully charged battery; rather, it indicates eighty percent of rated full charge.

Figure 5:
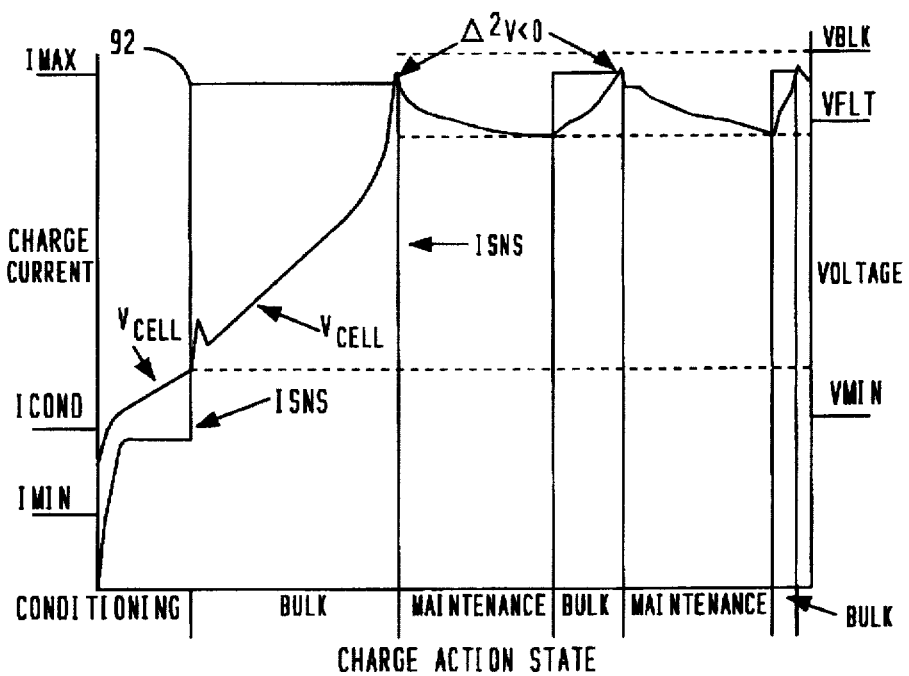
FIG. 5 illustrates a charging profile for the constant-current pulse mode.

Referring now to FIG. 5, there is illustrated the charging profile for the constant-current pulse mode. In the constant-current pulse mode, a conditioning state is provided similar to the conditioning state in the constant-current-mode of FIG. 4. The transition from the conditioning state to the next state, the bulk state, is noted by a point 92. This is labelled as the bulk state. In the bulk state, the cell voltage $V_{CELL}$ rises. In the constant-current pulse mode, the decision is based upon either the voltage reaching the $V_{BLK}$ mode, the fully charged state indicated by the gradient method, or the time-out period of the MTO timer. Upon changing from the conditioning state to the bulk state, the hold-off period occurs. This is approximately 0.015 of the MTO timer. This only occurs at this transition and does not occur again. Upon reaching the transition at the end of the bulk state when, as described above, the voltage either exceeds $V_{BLK}$, the fully charged state as indicated by the gradient change method or the time-out period has occurred, the system goes into a maintenance state. In the maintenance state, the modulation is turned off and the battery is allowed to idle or self-discharge. The voltage is monitored until it falls below the $V_{FLT}$ voltage. When this occurs, a transition is made back into the bulk state to a current regulation mode at $I_{MAX}$. Again, the MTO timer is reset upon the transition from the bulk state to the maintenance state such that, upon transitioning from the maintenance state to the bulk state, the MTO timer is again initiated. This will continue indefinitely. It is important to note that when the transition from the maintenance state to the bulk state occurs, no hold-off is asserted. The hold-off period, again, is a period during which no decision is made to prevent false voltage transients from making the incorrect decision.

The advantage of the constant-current pulse mode is that provides a method to compensate for battery aging. As the battery ages, the cell voltage may not reach the initial $V_{BLK}$ of a new battery, but the charge control of the present invention terminates the bulk charge state by detecting the gradient change of the cell voltage, which will be described hereinbelow, and which is a characteristic of the battery's electrochemistry. This threshold is used to terminate the bulk state on every charge cycle and offers and automatic compensation to ensure full charge is replenished, regardless of the battery age or cell voltage degradation. The pulse charging method also has benefits in prolonging battery life by reducing the continuous charge potential during "float" applications.

Figure 6:
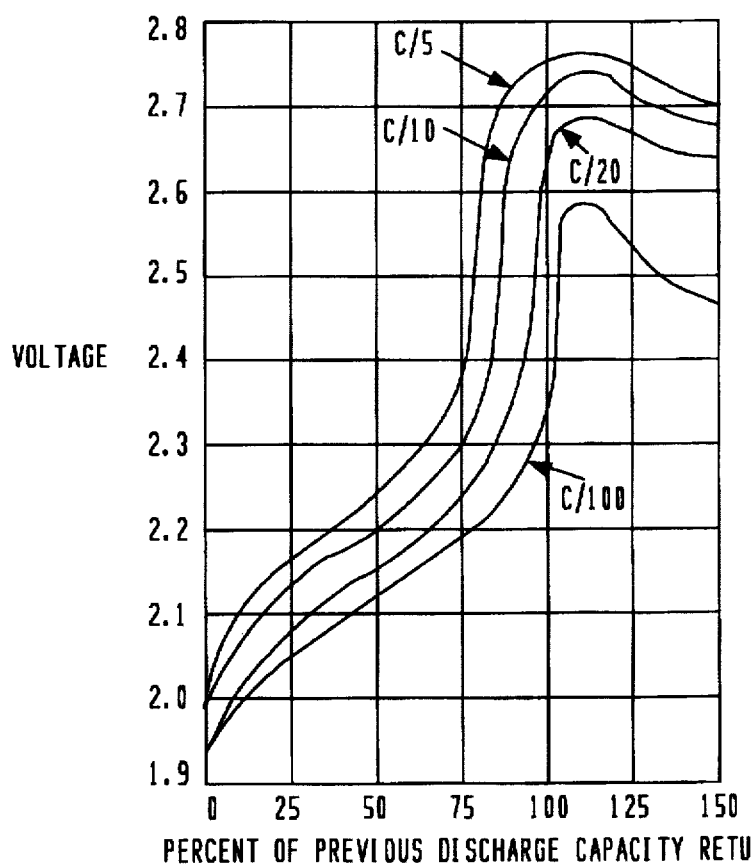
FIG. 6 illustrates a voltage profile for the constant-current charging of different aged batteries.

As noted above, optimum battery charge life cycle is gained when the battery is always replenished to its substantially full capacity. Since the optimum charge threshold varies during the battery's life, the charge termination must also vary. FIG. 6 illustrates voltage profiles for constant-current charging of batteries which illustrates the percent of previous discharge capacity returned as a function of current. It can be seen that as the battery is charged over time, the voltage will go up and then "turn" and begin to decrease. The problem exists when the battery is fast charged above this turn as it degrades battery performance. The bulk state termination operation is typically set at or below the "turning." point such that the battery will not degrade. This is illustrated more clearly in FIG. 7, which represents plots of the relationship between cell voltage, pressure and temperature during constant-current charging. It can be seen that when the cell voltages increase, as indicated by a rising level 96, that the cell temperature begins to increase but, more importantly, the cell pressure begins to increase, as indicated by a rising portion 98 of the cell pressure curve. It is desirable to terminate charge when the cell voltage increases, but prior to a significant increase in either cell temperature or cell pressure.

Figure 8:
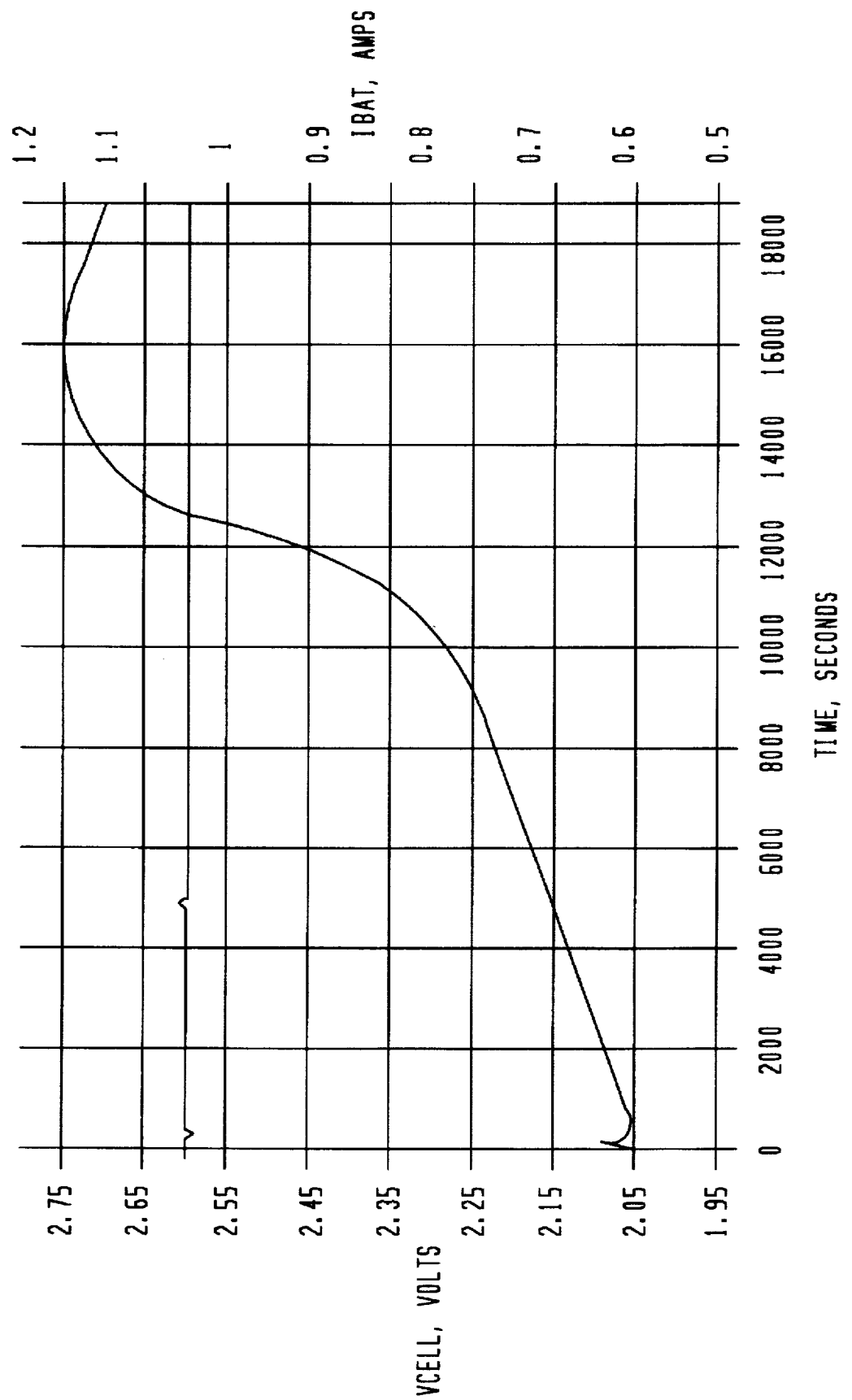
FIG. 8 illustrates typical charge profile of the battery.

A typical charge profile is illustrated in FIG. 8, wherein the cell voltage is plotted against time at a given current. This plot represents the deep discharge for a 6 volt gel-cell. The initial voltage rise in this charge plot is due to the increase in impedance resulting from a deep discharge.

Figure 9:
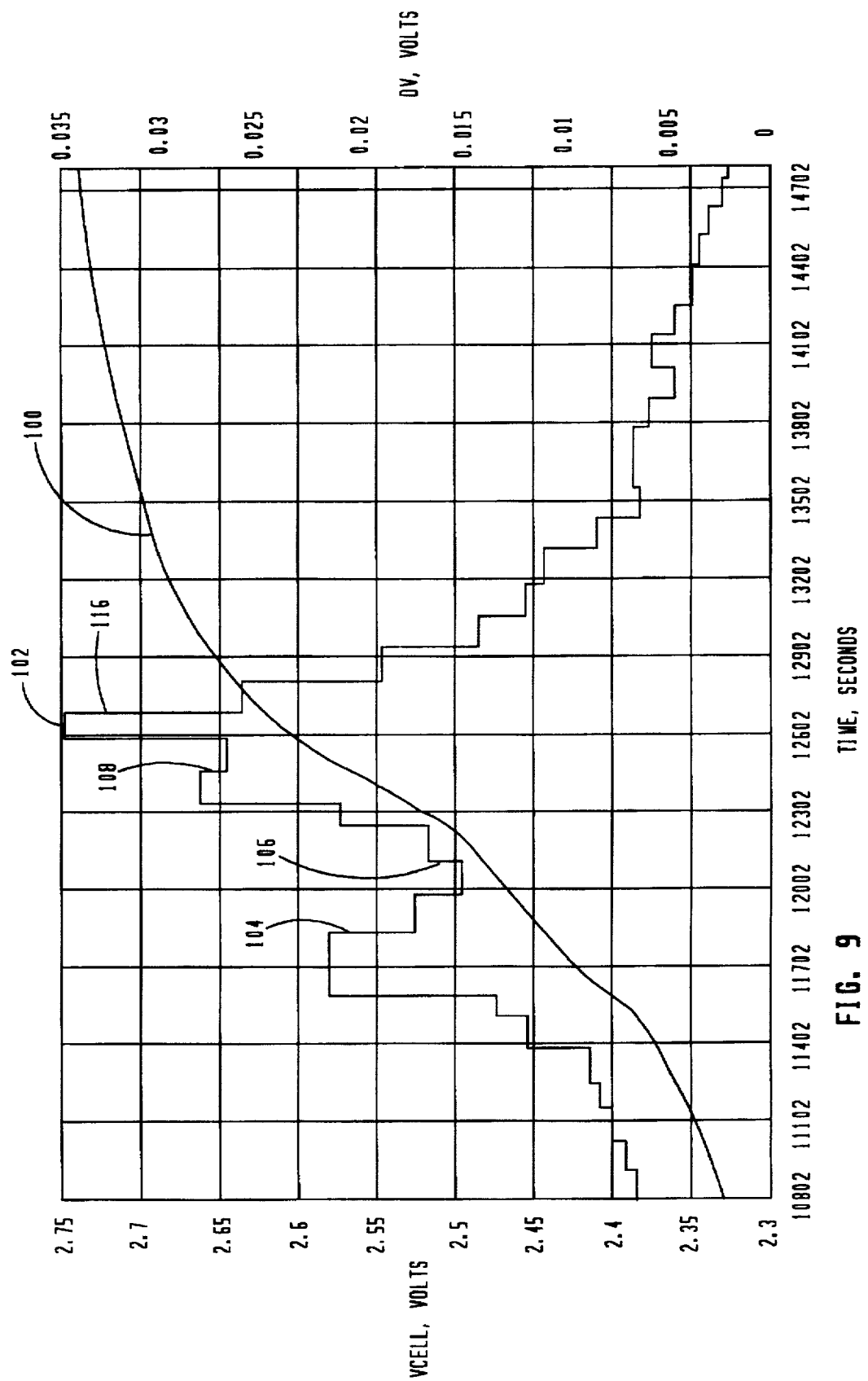
FIG. 9 illustrates a detail of the typical charge profile of FIG. 8.

FIG. 9 illustrates a magnification of the decision point that exists in the profile of FIG. 8 at the time when recombination of oxygen constituted at the positive plate and hydrogen generated at the negative plate begins to take place. This is illustrated with a plot 100 which is the actual plot of voltage as a function of time and a sampled curve 102 which represents the change in the voltage as a function of the sampled time. The sampling time is approximately 100 seconds. If the accumulated and continuous negative change in voltage exceeds −10.0 mV, then this is defined as a termination decision, i.e., the gradient of the change has become negative. Note that any positive increase will reset the accumulation operation. For example, the change initially begins to go negative at a point 104 and undergoes a negative change of approximately 5.0 mV. On the next sample, it again goes negative by an additional 2.0 mV. However, the next change, noted by a point 106, indicates that the change is positive, this then resetting the accumulation operation. The accumulation operation then goes negative once more at a point 108, prior to going positive again. However, it then turns negative at a point 110, at which the transition is −10.0 mV. At this point, a transition decision is made and this is defined as the "turning" point. It is important to note that this point essentially represents eighty percent of the charge state of the battery, and by utilizing this point, overcharging of the battery can be prevented. However, it is important to note that this decision is based upon the chemistry of the battery rather than upon external voltages. Therefore, even though an aging battery was inserted in the charger, this would not affect the determination decision. It would be the same regardless of the age of the battery. This is to be compared with the voltage detection methods wherein the charging operation were terminated when the voltage reached the $V_{BLK}$ level. For an aging battery, it may never reach this level.

The gradient termination technique prevents excessive pressure buildup that can cause venting and drying of the electrolyte. This technique also limits the rise in temperature which is detrimental to the battery separator and electrode current collector materials. The gradient change method of termination is used for the bulk charge termination in both the constant current modes, mode 2 and mode 3, to achieve efficient fast charge with a safe and reliable termination. This provides a significant advantage when charging at high current rates, since the "turning" point or "rollover" point is a battery characteristic that occurs predictably due to the chemistry of the battery independent of the age of the battery.

Figure 10A:
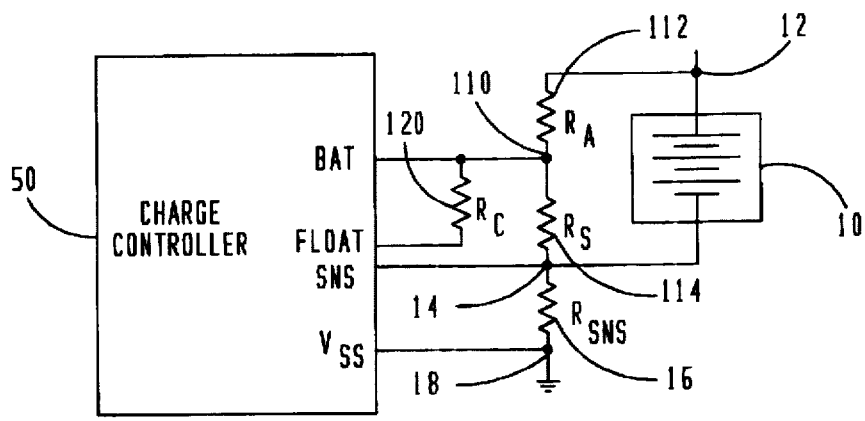
FIGS. 10a and 10b illustrate diagrammatic views of BAT connection and the thermistor connection.
Figure 10B:
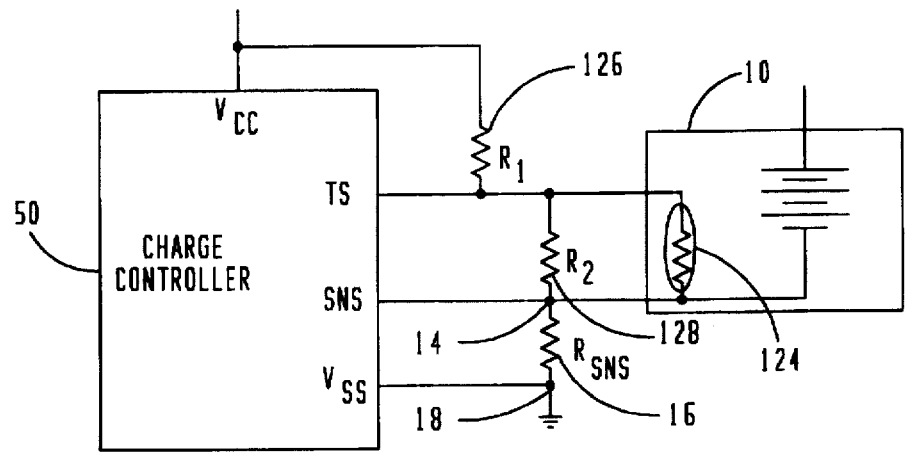

Referring now to FIGS. 10a and 10b, there are illustrated diagrammatic views of the configuration of the charging controller for both a battery voltage connection, illustrated in FIG. 10a, and a thermistor connection illustrated in FIG. 10b. In FIG. 10a, the charge controller IC 50 has the BAT voltage connected to a node 110. The BAT input represents the single-cell input for the overall configuration. A resistor divider is provided comprised of the resistor 112 connected between the positive terminal of the battery or node 12 and the node 110, a resistor 114, connected between the node 110 and the negative terminal of the battery on node 14 and the sense resistor 16 connected between the node 14 and the node 18. The resistor 112 is labelled $R_A$, the resistor 114 is labelled $R_B$ and the resistor 116 is labelled $R_{SNS}$. A resistor 120 is connected between the node 110 and the FLOAT output, this being a state-control output. This is internally an open-drain output for an external resistor divider network connection to control the voltage on a BAT input. As will be described hereinbelow, this output is essentially connected to the side of the resistor 120 to the SNS input. FIG. 10b illustrates a thermistor connection wherein a thermistor 124 is connected between the TS input and SNS input on node 14, thermistor 124 disposed adjacent the battery 10. A resistive divider is formed with a first resistor 126 connected between the $V_{CC}$ input to the controller 50 and the PS input and a second resistor 128 connected between the TS input and the node 14 on the SNS input. This allows a temperature voltage to be provided at the TS input for use in monitoring the temperature of the battery 10, as will be described in more detail hereinbelow.

The voltage and temperature must fall within acceptable limits before charging is initiated. The $V_{TEMP}(V_{TS}-V_{SNS})$ voltage is compared to an internal low-temperature threshold of $V_{LTF}(0.6 * V_{CC})$ and a high temperature threshold of $V_{HTF}(0.4 * V_{CC})$. For the bulk charge to be initiated, $V_{TEMP}$ must be greater than $V_{HTF}$ and less than $V_{LTF}$. These limits are stopped at the temperature range to qualify bulk and maintenance charging. The pulse current mode of FIG. 3 illustrates that the conditioning state is active whenever the voltage $V_{TEMP}$ is less than the voltage $V_{HTF}$. If the battery temperature is outside these limits, the charge controller 50 enters the charge-pending state with no charge action and waits until the temperature is within the limits.

The charge controller 50 also provides for under voltage protection by detecting when the battery voltage is below the low-voltage threshold voltage $V_{MIN}$. In the case of a deeply discharged battery ($V_{CELL}<V_{MIN}$), the charge controller 50 enters the conditioning state and charges the battery until the voltage and current increase, indicating positive charge acceptance. The conditioning algorithm is based on the SAE industry-standard J537 charge acceptance test procedure. The conditioning algorithm first provides a constant voltage ($V_{FLT}+0.250V$) for a predetermined length of time and then measures if the charge current $I_{SNS}$ is greater than or equal to $I_{COND}$ during this predetermined period of time, state one is terminated and the conditioning state two is initiated. This essentially determines if current is flowing through the battery. If current is not flowing through the battery, a fault indication is displayed. This indicates that current is not flowing and that charge action is stopped. In the second conditioning state, that existing when the current rises above the current $I_{COND}$, a constant current is applied. This constant current is applied for a predetermined length of time. If the voltage rises to a level greater than $V_{MIN}$ during this time-out, the conditioning state two is terminated and a bulk state is initiated. This was described hereinabove with reference to FIG. 3. The conditioning algorithm senses the current after the first period of time during conditioning state one and after the second period of time. If the current after the first period of time in conditioning state one exceeds the current $I_{COND}$ or, alternatively, the cell voltage $V_{CELL}$ is less than $V_{MIN}$ at the end of second period of time, a conditioning maximum time-out (MTO) fault is indicated.

A precision internal reference is provided that is temperature-compensated to track the lead-acid cell's reaction temperature coefficient. Temperature compensation asserts proper charging and termination over an extended temperature range. The float voltage is a critical value that is precisely regulated to prevent overcharging, extend battery life and ensure that a full charge is maintained. The charge controller 50 varies the float voltage based on the battery temperature to compensate for changes in the battery charge rate. This is typically utilized in the maintenance mode. The internal reference is precisely designed to track the lead-acid cell's coefficients of −3.7 mV (°C.).

As described hereinbelow, there is a soft program input DSEL that has three modes, one for a logic "0", when tied to ground through a high impedance device, a logic "1" when it is tied through a resistor to a high voltage and a "float" mode wherein no impedance or an infinite impedance is disposed between the DSEL program input during the program sense operation and either positive or negative terminals. Therefore, three modes of display are provided for, which allow a higher degree of flexibility for different types of visual displays and varying amounts of displayed information. The DSEL=0 mode is intended for implementation of a simple two-LED indication signal where one LED indicates charging and the second LED indicates completion. The DSEL=1 mode is for implementation of a single, common cathode tri-color LED such that charging, completion and default each have a unique color. The DSEL=Z mode is intended to offer charging capacity information in the constant-voltage mode by indicating the top-off state wherein approximately eighty percent or greater charge has been replenished. In all modes, $LED_3$ indicates the charge pending or full condition. The $LED_{1-3}$ flashing rate is typically ⅛ second on and ⅛ second off. The summary of the display functions is provided in Table 3.

TABLE 3

| CHARGER DISPLAY OUTPUT SUMMARY | | | | |
| --- | --- | --- | --- | --- |
| Mode | Charge Action State | $LED_1$ | $LED_2$ | $LED_3$ |
| DSEL = 0 (Mode 1) | Battery absent or over-voltage fault | 0 | 0 | 1 |
| | Charge conditioning | Flashing | 0 | 0 |
| | Bulk or top-off charging | 1 | 0 | 0 |
| | Maintenance charging | 0 | 1 | 0 |
| | Charge pending (temperature out of range) | X | X | Flashing |
| | Charging fault (over-voltage or conditioning MTO) | X | X | 1 |
| DSEL = 1 (Mode 2) | Battery absent or over-voltage fault | 0 | 0 | 1 |
| | Charge conditioning | 1 | 1 | 0 |
| | Bulk charging | 0 | 1 | 0 |
| | Maintenance or top-off charging | 1 | 0 | 0 |
| | Charge pending (temperature out of range) | X | X | Flashing |
| | Charging fault (over-voltage or conditioning MTO) | X | X | 1 |
| DSEL = Float (Mode 3) | Battery absent or over-voltage fault | 0 | 0 | 1 |
| | Charge conditioning | Flashing | Flashing | 0 |
| | Bulk charging | 0 | 1 | 0 |
| | Top-off charging | 1 | 1 | 0 |
| | Maintenance charging | 1 | 0 | 0 |
| | Charge pending | X | X | Flashing |

TABLE 3-continued

| CHARGER DISPLAY OUTPUT SUMMARY | | | | |
| --- | --- | --- | --- | --- |
| Mode | Charge Action State | $LED_1$ | $LED_2$ | $LED_3$ |
| | (temperature out of range) Charging fault (over-voltage or conditioning MTO) | X | X | 1 |

Note: $1 = V_{CC}$, $0 = V_{SS}$, X = don't care

Figure 11:
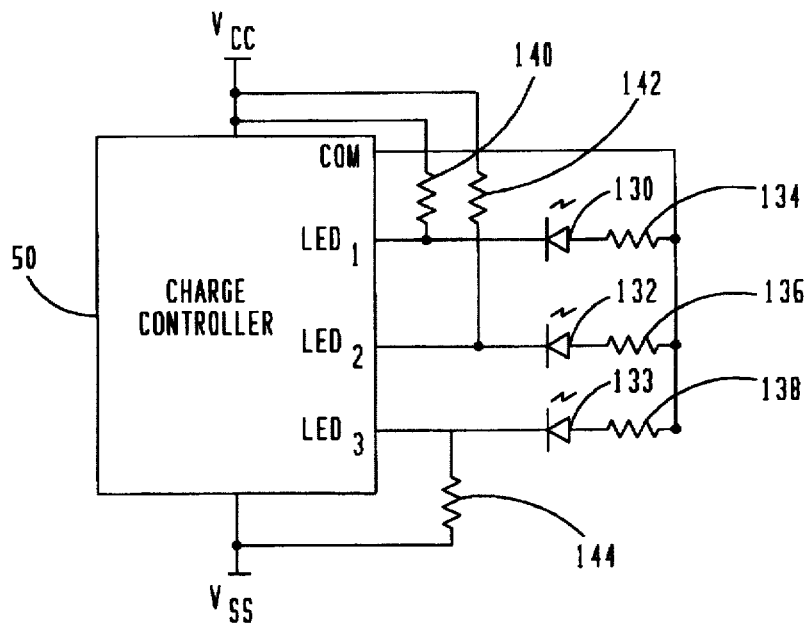
FIG. 11 illustrates the soft programming operation wherein the digital output pins are multiplexed to allow them to act as inputs.

Referring now to FIG. 11, there is illustrated a connection diagram for the sole programming operation. Three LEDs 130, 132 and 133 are illustrated, having the anode thereof connected through resistors 134, 136 and 138, respectively, to the COM input. The cathode of each of the LEDs 130, 132 and 133 are connected to their respective LED inputs, $LED_1$, $LED_2$ and $LED_3$. In operation, the $LED_{1-3}$ inputs are pulled low when the appropriate one of the LEDs 130, 132 or 133 is turned on. The COM pin is connected high such that current will flow through the LEDs 130-133. However, during a programming mode, the COM pin is open-circuited such that current does not flow through the LEDs 130, 132 and 133. This occurs during a program READ step, usually done on power up. To facilitate this programming operation, a high impedance is disposed between the respective one of the $LED_{1-3}$ inputs and then they are utilized as a programming input as opposed to a driver output. For illustrative purposes, the $LED_1$ pin is connected through a resistor 140 to $V_{CC}$ and the $LED_2$ pin is connected to a resistor 142 to $V_{CC}$. The $LED_3$ pin is connected through a resistor 144 to the negative terminal $V_{SS}$ of the charger 50. Therefore, this represents a "1" on $LED_1$, a "1" on $LED_2$ and a "0" on $LED_3$. This corresponds to a TSEL value of "1", a DSEL value of "1" and a QSEL value of "0". This will result in the mode one for the display output and the selection of the constant voltage mode with QSEL set to "0". This operation is described in more detail in U.S. patent application Ser. No. 08/450,220, filed May 1, 1995.

Figure 12:
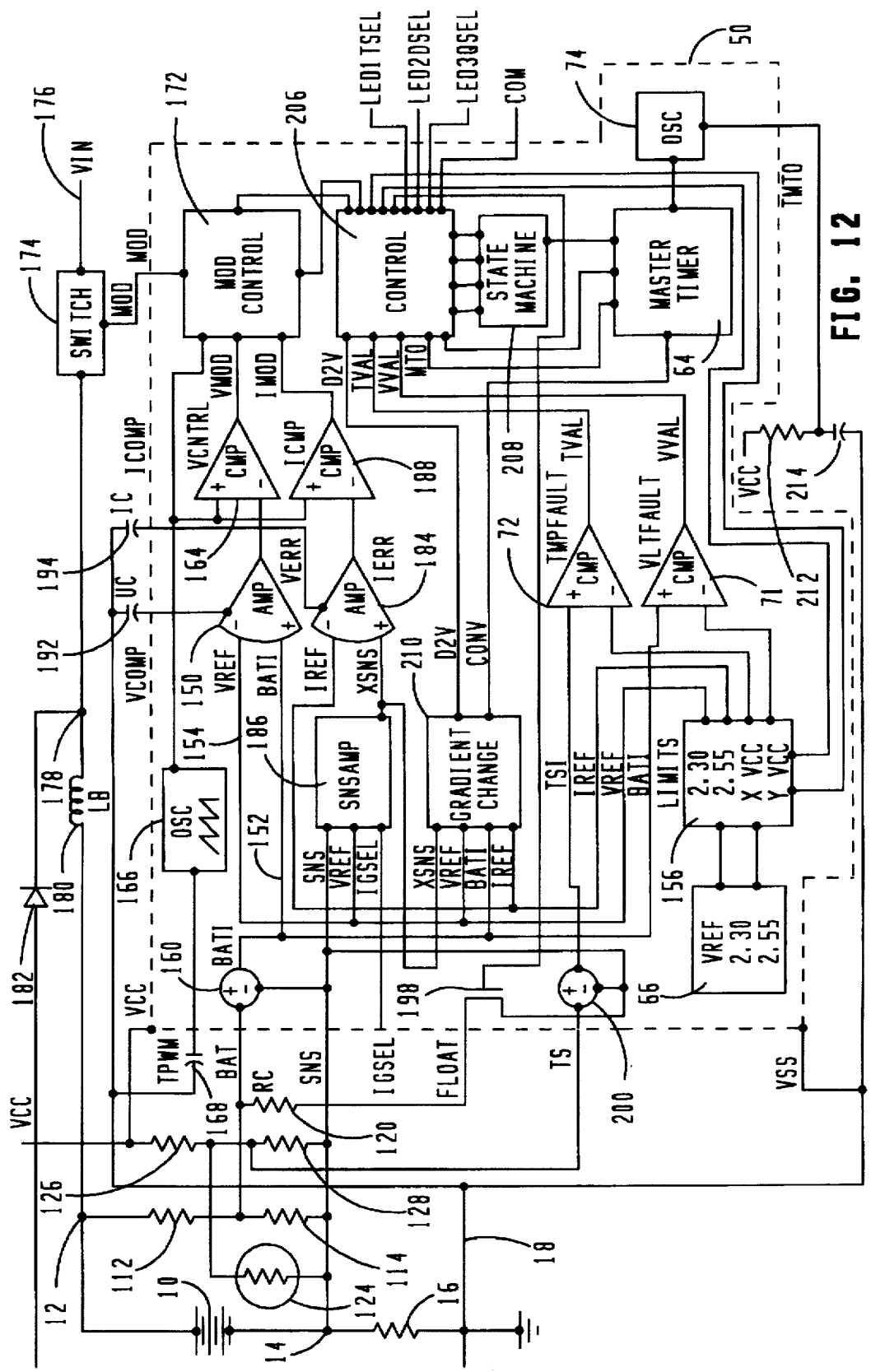
FIG. 12 illustrates a detailed logic diagram of the integrated circuit charge controller and one configuration thereof.

Referring now to FIG. 12, there is illustrated a more detailed block diagram of the charger 50 illustrating the configuration for one exemplary configuration. The charger 50 is illustrated by phantom lines. The voltage/current regulator 70 is comprised of two separate loops, a current loop and a voltage loop. The current loop is operable to provide the current regulation and the voltage loop is operable to provide the voltage regulation. The two operations, as will be described hereinbelow, are "ORed" together. The voltage loop is comprised of a voltage error amplifier 150, which has the positive input thereof connected to a terminal 152 and the negative input thereof connected to a voltage reference terminal 154 labelled VREF. This is a voltage of 2.55 volts which is received from a voltage scaling or distribution device 156, the voltage scaling device 156 referenced to the temperature compensated reference voltage 66. As described above, the temperature compensated voltage reference 66 is comprised of the bandgap voltage reference generator that outputs a voltage of 2.30 and 2.55 volts.

The terminal 152 is connected to the output of a subtraction circuit 160 which has the positive input thereof connected to the BAT input to sense the cell voltage level and the negative input thereof connected to the SNS input which is connected to the negative terminal of the battery 10. In this manner, the voltage across the battery, including the resistive divider 112 and 114 is independent of the current through the sense resistor 16. Therefore, the error signal on the output of the error amplifier 150 VERR is a function of the difference between the output of the subtraction circuit 160 and the voltage VREF. This is input to the negative input of modulation control comparator 164, the positive input thereof connected to the output of a ramp oscillator 166. The timing for the ramp oscillator 166 is referenced to an external capacitor 168 that has one plate thereof connected to the TPWM input and the other plate thereof connected to $V_{SS}$. This allows the user the ability to change the pulse width modulation frequency. The output of the comparator 164 provides the output VMOD. This provides a voltage modulation PWM control signal for a conventional switching power supply operation. The voltage VMOD is input to a modulation control 172 which is operable to generate the MOD output which is then input to an external switch 174 or gate element for use with a switch-mode buck rate regulator configuration.

The switch 174 is operable to switch an input voltage on a line 176 to a node 178. Node 178 is hooked to one side of a switching inductor 180, the other side thereof connected to the node 112. A switching diode 182 has the anode thereof connected to the node 170 and the cathode thereof connected to the ground terminal 18. This is a conventional switching regulator configuration.

The current loop has associated therewith a current error amplifier 184, having the positive input thereof connected to a sense reference voltage XSNS, which is output by a sense amp 186, sense amp 186 being a programmable gain sense amp. The sense amp 186 is programmed by the IGSEL input. This sets the value of $I_{MIN}$ as a function of the value of $I_{MAX}$. When the IGSEL input is connected directly to ground, the $I_{MIN}$ current is set equal to $I_{MAX}/10$. When the IGSEL input is connected to $V_{CC}$, the $I_{MIN}$ value is set to $I_{MAX}/20$. When the IGSEL input is allowed to "float", the $I_{MIN}$ value is set to $I_{MAX}/40$.

The sense amp 186 is connected to the SNS input at node 14 on the negative terminal of the battery 10 and also to the $V_{REF}$ output of the voltage distributor 156, this being the voltage value of 2.30V. The reference input, the negative input of the error amplifier 184, is connected to a current reference IREF, which is a value of 2.5 volts output by the voltage distributor 156, it being noted that $I_{MAX}$ ranges from 2.55 to 2.3 volts and ISNS ranges from 2.55 to 2.3 volts. The output of the error amplifier 184, IERR is input to the negative input of a modulator circuit 188, the positive input thereof connected to the output of the ramp oscillator 166. Compensation inputs for both the voltage error amplifier 150 and the current error amplifier 184 are connected to one side of compensation capacitors 192 and 194, respectively. The modulation circuit 188 is operable to output the current modulation control signal IMOD which is input to the modulation control circuit 172.

The float input is connected to one side of the source/drain path of an N-channel transistor 198, the other side thereof connected to the SNS input. The FLOAT input is connected to one side of the resistor 120 such that when the gate thereof is raised high, resistor 120 is placed in parallel with resistor 114, thus lowering the voltage BAT to the FLOAT voltage, the FLOAT voltage discussed hereinabove as being essentially the cell voltage.

The voltage on one side of the thermistor 124 is input to the TS input of the controller 50. This is input to the positive input of a subtraction circuit 200, the negative input thereof connected to the $V_{SS}$ voltage. The output of the subtraction circuit 200 is input to the positive input of the comparator 72 which is a temperature fault comparator. Its negative input is connected to a voltage reference $X \cdot V_{CC}$ output by the voltage distributor circuit 156. Whenever the voltage on a positive input falls below a predetermined level, the output of the comparator 72, TVAL, will change state, indicating a "Pending" condition, wherein the MOD output will be inhibited. This is input to a control circuit 206, which is run by a state machine 208, the state machine 208 receiving one of its inputs from the master timer circuit 64. The temperature input is therefore referenced to the sense input which varies as a function of temperature.

The comparator 71 is the voltage fault comparator which has the negative input thereof connected to a voltage $Y \cdot V_{CC}$ output by the voltage distributor circuit 156 and the positive input thereof connected to the BATI output of the subtraction circuit 160, the same input that was input to the positive input of the voltage error amplifier 150. This, therefore, represents the battery voltage. Whenever the battery voltage rises to a level that is beyond acceptable limits, the output of the comparator 71, $V_{VAL}$, will change states, this being input to the control circuit 206.

The gradient change operation is controlled by a gradient change circuit 210, which is operable to receive the XSNS output of a sense amp 186, the $V_{REF}$ voltage and the IREF voltage output by the voltage distributor 156 and the IREF reference voltage.

The timing of the oscillator 74 is set by a series connected resistor 212 and capacitor 214, resistor 212 connected between $V_{CC}$ and the TMTO input. Capacitor 214 is connected between the TMTO input and ground. The resistor 212 is referred to as the $R_{MTO}$ resistor and the capacitor 214 is referred to as $C_{MTO}$. The following relationship defines the values of the resistor 212 and capacitor 214:

$$t_{MTO}hours = R_{MTO}(K\Omega) \cdot C_{MTO}(\mu F) \cdot 10 \qquad (1)$$

Similarly, the capacitor 168 on the TPWM input is utilized to set the PWM frequency of the ramp generator 166. The capacitor 168 is referred to as the $C_{PWM}$ capacitor. The following relationship defines the PWM frequency:

$$F_{PWM}(KHE) = \left( \frac{1}{C_{PWM}\mu F} \right) \cdot 10^{-1} \qquad (2)$$

As can be seen from Equation 1, the timing of the oscillator 74 is preset to become a function of the capacity of the battery. The maximum time-out is set such that, if the battery were to charge for this amount of time, it would theoretically replace all of the charge depleted from the battery. For example, if the battery were a 5 amp-hour battery, this would provide an output current of 5 amps for one hour. Therefore, if the maximum current input to the battery during the current regulation mode were set to 5 amps, one would not want the battery to charge for much more than one hour and the time-out period would be set to just in excess of one hour. If the current were set to 1 amp, the MTO timer would be set for a time of five hours or slightly more. Another important aspect is that all time periods during the operation of the present system are "ratioed" off of the MTO timer. As such, by setting the maximum time based upon capacity, all other time-out periods can be adjusted and these are adjusted as a function of capacity of the battery. As such, if a larger battery were incorporated into the system, the time-out period would be adjusted for the master time base, but all other time-outs, such as hold-off periods, the conditioning time periods T1 and T2 would also be adjusted. This is adjusted with one single input. The various time-outs for the system are depicted in Table 4.

regulation, the IMOD signal is always a narrow pulse and is always present when the VMOD signal goes high and

TABLE 4

Figure 7:
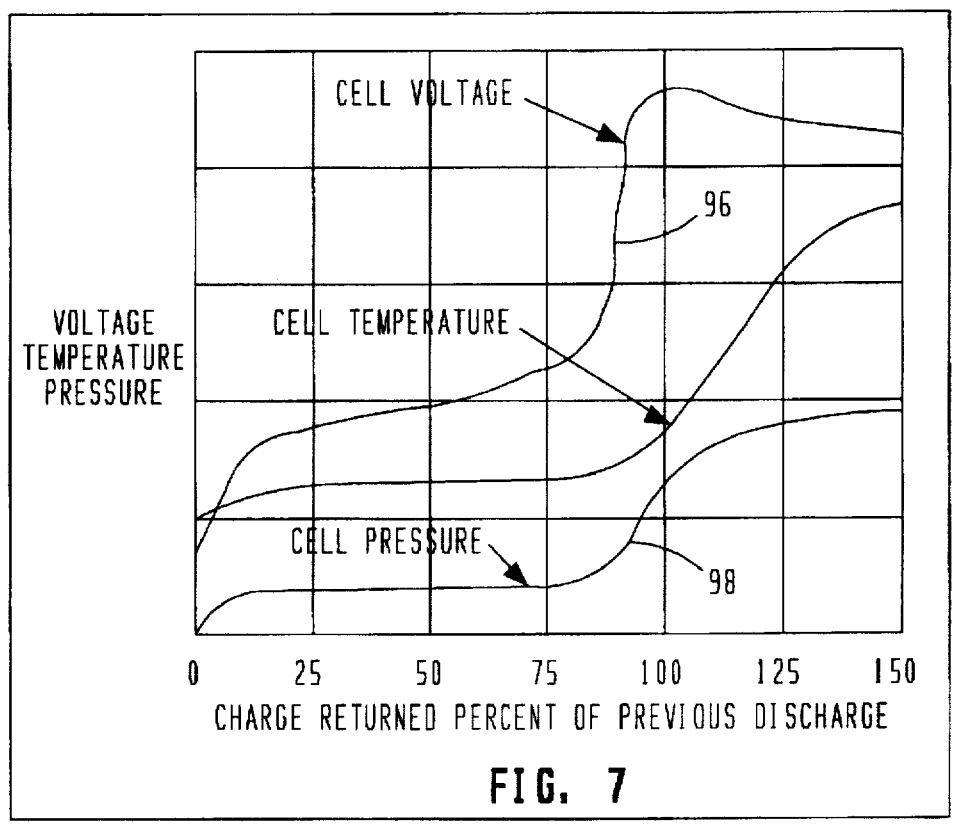
FIG. 7 illustrates the relationship of cell voltage, pressure and temperature during constant-current charging.

| Symbol | Parameter | Minimum | Typical | Maximum | Unit | Notes |
|---|---|---|---|---|---|---|
| $t_{MVC}$ | $V_{CELL}$ greater or equal $V_{MCV}$ valid period | 200 | 250 | 300 | ms | If $V_{CELL} \geq V_{MVC}$ for $T_{MCV}$, then a transition of $V_{CELL} < V_{MCV}$ is recognized as a battery replacement |
| $t_{TH}$ | Hysteresis of voltage threshold | 100 | — | 300 | ms | |
| $t_{MTO}$ | Charge timer time-out range | 1 | — | 24 | hours | See FIG. 7, Equation 7 |
| $t_{UV1}$ | Conditioning time-out current sense period | — | $0.02t_{MTO}$ | — | | Ratio of $t_{MTO}$ |
| $t_{UV2}$ | Conditioning time-out voltage sense period | — | $0.16t_{MTO}$ | — | | Ratio of $t_{MTO}$ |
| $t_{DV}$ | $\Delta^2 V/\Delta t^2$ termination sample period | — | $0.008t_{MTO}$ | — | | Ratio of $t_{MTO}$ |
| $t_{HOLDOFF1}$ | Conditioning state 2 hold-off time period | — | $0.002t_{MTO}$ | — | | Ratio of $t_{MTO}$ |
| $t_{HOLDOFF2}$ | Bulk-charge hold-off time period | — | $0.016t_{MTO}$ | — | | Ratio of $t_{MTO}$ |
| $F_{PWM}$ | Regulator timebase frequency range | — | 100 | TBD | KHz | See FIG. 7, Equation 6 |
| | External $C_{PWM}$ range | — | 0.001 | — | µF | |
| | Charge timer time-out ($t_{TMO}$) accuracy | | TBD | | | |
| | Regulator timebase frequency accuracy | | TBD | | | |

Figure 13A:
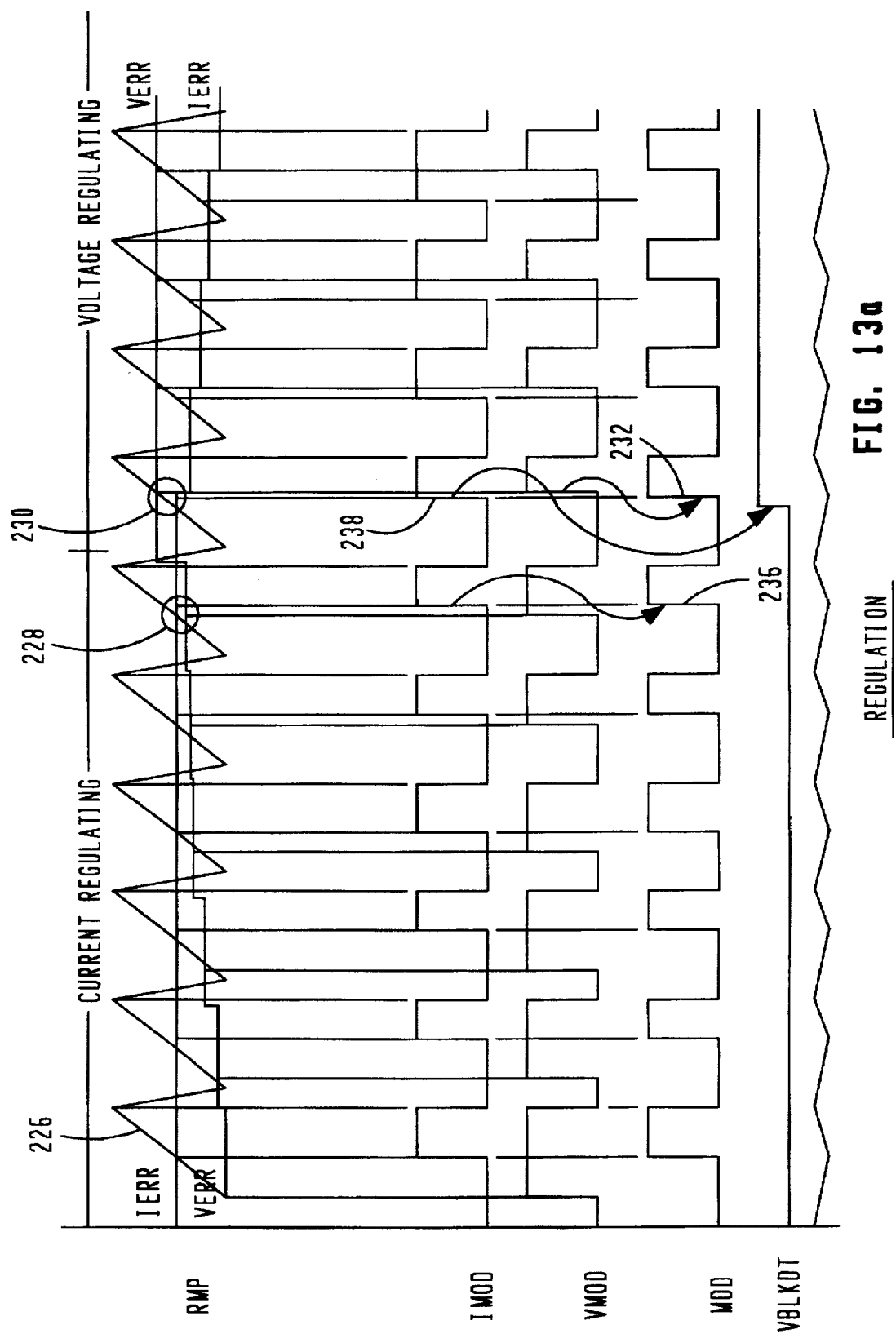
FIGS. 13a and 13b illustrate timing diagrams of the transition from current regulation to voltage regulation and the interaction of the two loops, the current loop and the voltage loop.
Figure 13B:
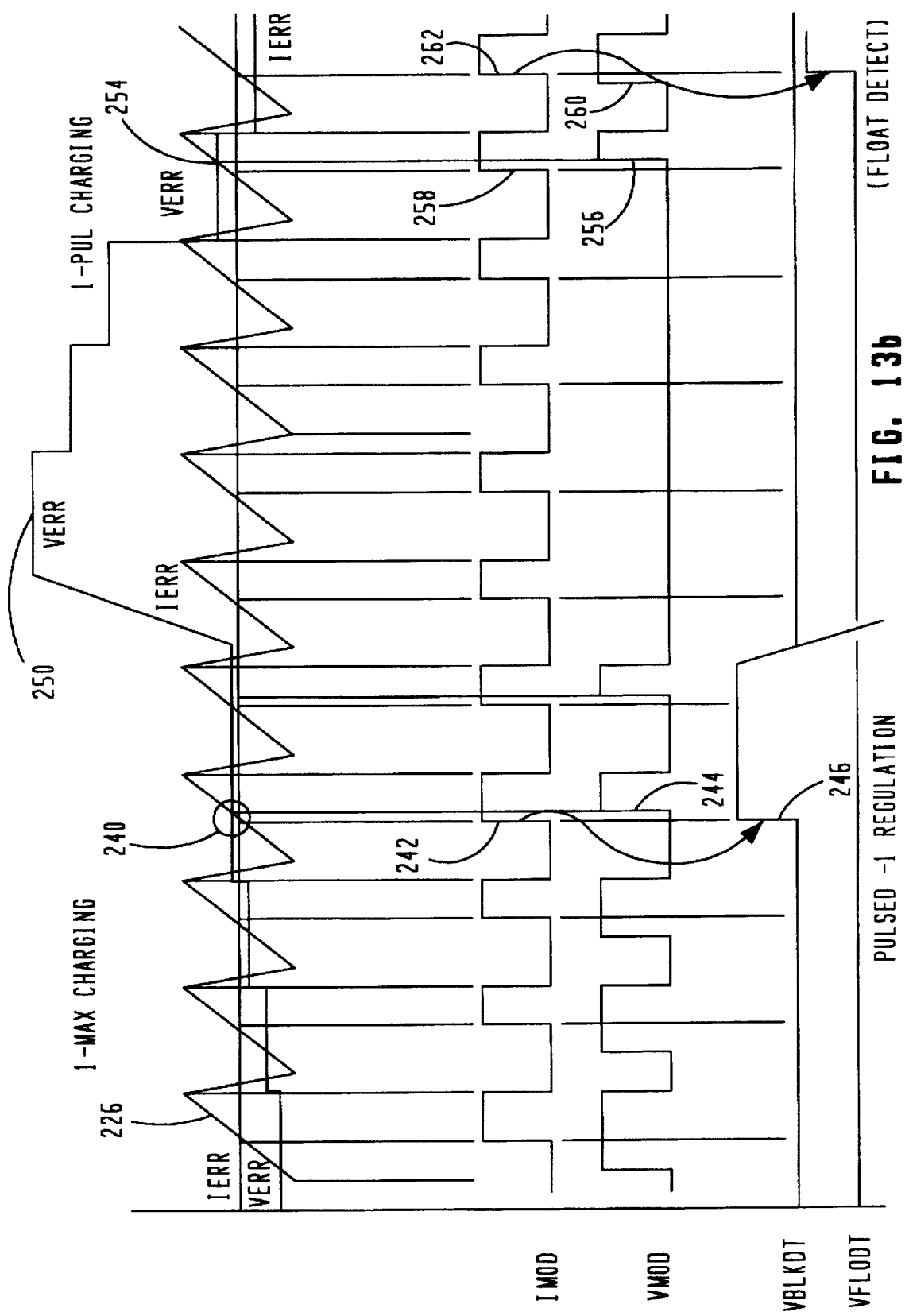

Referring now to FIGS. 13a and 13b, there are illustrated timing diagrams for the voltage regulation operation. In FIG. 13a, the constant voltage operation is illustrated wherein the charge controller makes a transition from current regulation to voltage regulation, this being the transition from the bulk mode to the top-off mode. In the current regulation mode, the current error value IERR is set to a predetermined value, since the IMOD output is utilized as a modulating PWM signal. The ramp signal is represented by a waveform 226 that, when the waveform 226 is at a higher voltage than the current error signal IERR, IMOD goes high. When the ramp waveform goes from a negative to a positive, IMOD undergoes a negative transition. Similarly, whenever the ramp signal is higher than VERR, VMOD undergoes a positive transition, and then undergoes a negative transition when the ramp goes from a positive to a negative transition.

Initially, the voltage of the battery BAT is lower than the reference voltage. As such, the error voltage VERR will be negative. As the voltage increases, the error decreases. This will cause the pulse width of VMOD to decrease and the level of VERR to approach the level of IERR. At a point 228, the level of VERR is slightly less than the level of IERR such that the leading edge of VMOD slightly precedes the leading edge of IMOD. On the next pulse, at a point 230, the level of VERR is greater than the level of IERR such that the leading edge of IMOD precedes the leading edge of VMOD. This indicates the point at which current regulation switches over to voltage regulation, i.e. the top-off state is initiated. This is indicated by a signal VBLKDT going high. The OR logic function of the IMOD and VMOD signals constitutes the MOD signal. It can be seen that during current therefore, constitutes the output of the OR function. The inverse is true during the voltage regulation portion. During voltage regulation, the current error voltage IERR will decrease. It can be seen that, due to the timing, there are no interruptions in the regulation operation, as the MOD signal is continually asserted, with the only difference being that the width of the pulse is determined by a voltage regulation scheme at the point 230. This "switchover" occurs prior to the edge of the MOD pulse indicated by a transition 232 which arises as a result of VMOD going high. The previous MOD pulse, represented by a positive transition 236, is triggered off of the rising edge of the corresponding IMOD pulse. It can be seen that VBLKDT goes high off of a transition 238 of the IMOD pulse that occurs at a point 230 which occurs prior to the leading edge 232 of the MOD pulse. This enhances stability.

Referring now to the timing diagram of FIGS. 13a and 13b, the timing operation for the constant-current pulse mode of FIG. 5 is illustrated. As described above, a constant-current state is followed by a maintenance state during which the voltage is allowed to "float". Initially, the system is placed in current regulation at $I_{MAX}$. In this mode, the IMOD pulse is narrowed and the VMOD pulse, since the VMOD pulse is the result of a VERR that is negative. This will continue until a point 240 has been reached where the system essentially goes into the voltage regulation mode for a short period of time. This is represented by a positive edge 242 of the IMOD pulse preceding a rising edge 244 of the VMOD pulse string. At this time, the VBLKDT signal is raised high at a rising edge 246 triggered off of the rising edge 242 of the IMOD pulse. Thereafter, the system will go into the IPUL charging mode wherein an IPUL signal (not shown) will go high, which will turn off the transistor 198 of FIG. 12 to unparallel the resistor 120 with resistor 114, thus raising the BAT voltage. When this voltage is raised the VERR signal will go high, indicated by a point 250. When this occurs, VMOD will go low and the MOD signal (not shown) will also go low such that there is no modulation. This will allow the voltage to float. The voltage will decrease until the error voltage VERR is less than the peak value of the waveform 266. This will occur at a point 254, thus creating a rising edge 256 on VMOD. From the time that IPUL is asserted and the BAT voltage is decreased to VFLOAT, the IERR signal is "forced" to a predetermined reference voltage, that being the reference voltage on the negative input of the current error amplifier. As such, the pulse width of IMOD will be maintained at a constant value. This will be in the leading edge of the IMOD pulse, a leading edge 258 preceding the leading edge 256 of the VMOD pulse. The VERR voltage will continue to decrease, thus increasing the width of the VMOD pulses until the leading edge of the VMOD occurs prior to the leading edge of IMOD. This occurs at a leading edge 260, which precedes a leading edge 262 of the IMOD pulse. The leading edge 262 will then trigger a VFLODT signal which is a signal that indicates that the float voltage has been reached, i.e., the BAT voltage is equal to VFLOAT. At this point, IPUL goes low and the system renters the current charging mode. Also, when IPUL is high, it inhibits MOD from being asserted, such that the pulse associated with leading edge 256 is not asserted as the MOD pulse.

Figure 14:
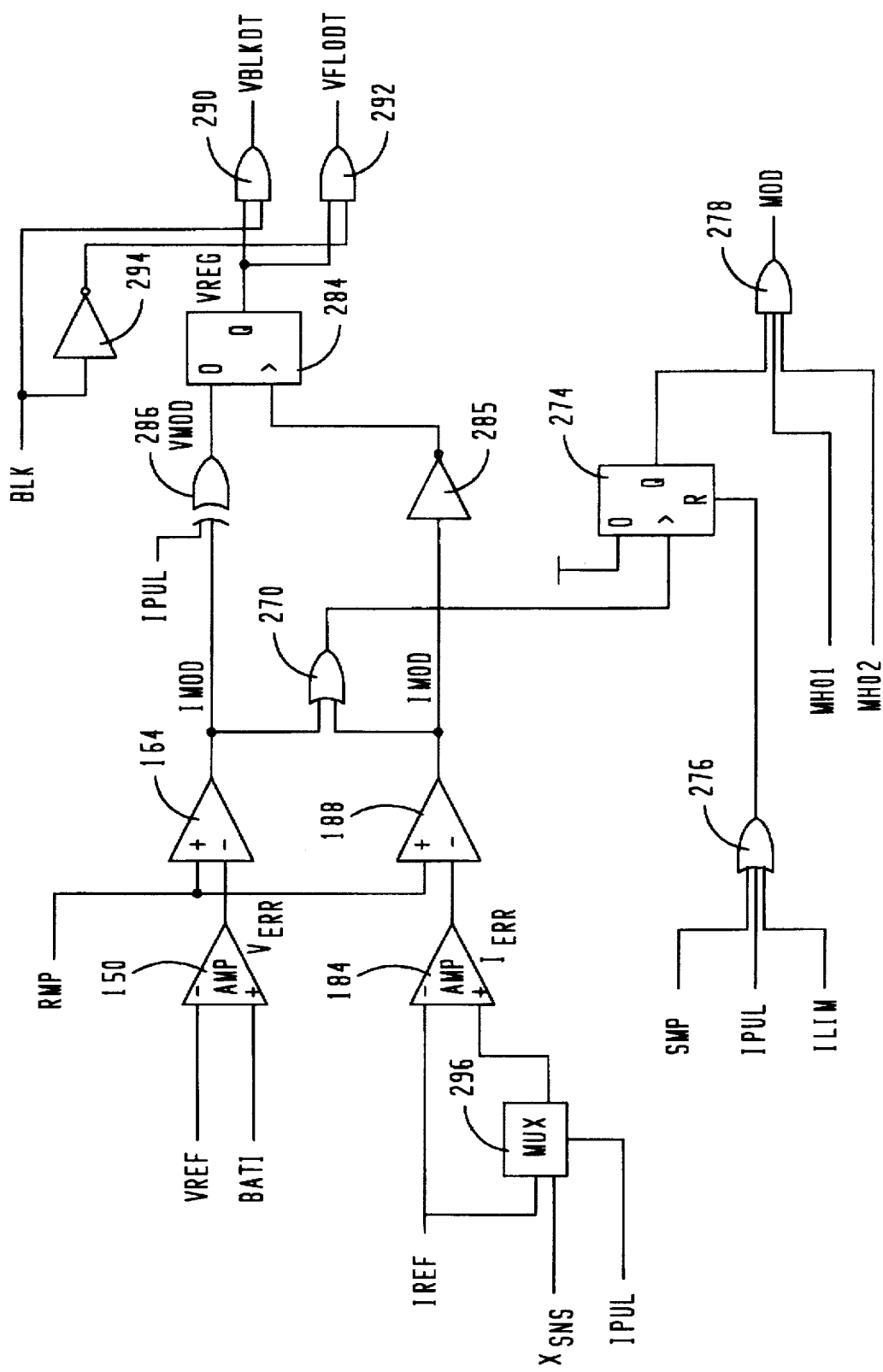
FIG. 14 illustrates a detailed logic diagram of the MOD control.

Referring now to FIG. 14, there is illustrated a more detailed block diagram of the modulator control 172. The output of the comparator 164, the VMOD output, and the output of the comparator 188, the IMOD output, are input to an OR gate 270. The output of the OK gate 270 is input to the clock input of a D-type flip-flop, the data input connected to $V_{CC}$. The reset input of the flip-flop 274 is connected to the output of a three input OR gate 276. OR gate 276 has three inputs connected to a sample signal SMP, the 12PUL signal and a current limit signal ILIM. This basically resets the flip-flop 274 when the ramp waveform 226 makes a transition from a positive ramp to a negative ramp. The IPUL signal will maintain the reset input of flip-flop 274 high such that it will effectively inhibit the Q-output of flip-flop 274 from going high. Similarly, the ILIM signal will also prevent the MOD signal from being asserted due to the current exceeding a current limit. The output of flip-flop 274 is input to one input of a three input AND gate 278, the output providing the MOD signal. The other two signals of AND gate 278 are connected to an MHO1 and an MHO2 signal, respectively. These are hold-off signals that are generated for the purpose of inhibiting the assertion of the MOD signal during predetermined hold-off periods, such as when the temperature is outside of preset limits, during the maintenance current duty cycle and predetermined faults.

In order to make a decision as to whether the rising edge of VMOD preceded the rising edge of IMOD or, if the rising edge of IMOD precedes the rising edge of VMOD in the pulse-current mode, a flip-flop 284 is provided, having the clock input thereof connected to the output of inverter 285, the output thereof connected to the IMOD signal. The D-input is connected to the output of an exclusive OK gate 286, which outputs the signal VMODX. One input of the exclusive OK gate 286 is connected to the VMOD signal and other input thereof is connected to the IPUL signal. Therefore, VMODX will only be high when either both inputs are low or both inputs are high. During the current regulation state of the pulse current mode, IPUL will be low and VMODX will be high when VMOD is low. Since the clock input is the inverted IMOD signal, the Q-output will only be triggered when the rising edge of IMOD occurs after the rising edge of VMOD.

The Q-output of the flip-flop 284, the VREG signal, is input to one input of an NAND gate 290 and one input of an AND gate 292. The other input of NAND gate 290 is connected to the BLK signal and other input of AND gate 292 is connected to the output of an inverter 294, the input thereof connected to the BLK signal. The BLK signal indicates when the bulk state is present. The NAND gate 290 outputs the VBLKDT signal and the AND gate 292 outputs the VFLODT signal.

In the current regulation operation in the bulk state of the pulse-current mode, the signal go high when VREG goes high, which occurs when the rising edge of IMOD precedes the rising edge of VMOD. This indicates the transition from the bulk state to the maintenance state, at which time the BLK signal goes low. Additionally, IPUL goes high. Since IPUL is high, the VMODX signal will now be 180° out of phase. In this mode, the VREG will be asserted whenever the rising edge of IMOD follows the rising edge of VMOD. At this point, VFLOADT will be asserted. This will then make the transition from the maintenance state to the bulk state, raising the signal BLK and lowering IPUL.

A multiplexer 296 is provided on the positive input of the error amplifier 194 which allows IERR to be set to a finite level whenever IPUL is raised high. The multiplexer 296 has the output thereof connected to the positive input of the error amplifier 194, and has two inputs, one of which is connected to the XSNS signal and the other of which is connected to the IREF signal. The IREF signal is then connected to both inputs of the error amplifier 184 when the IPUL signal is high.

Figure 15:
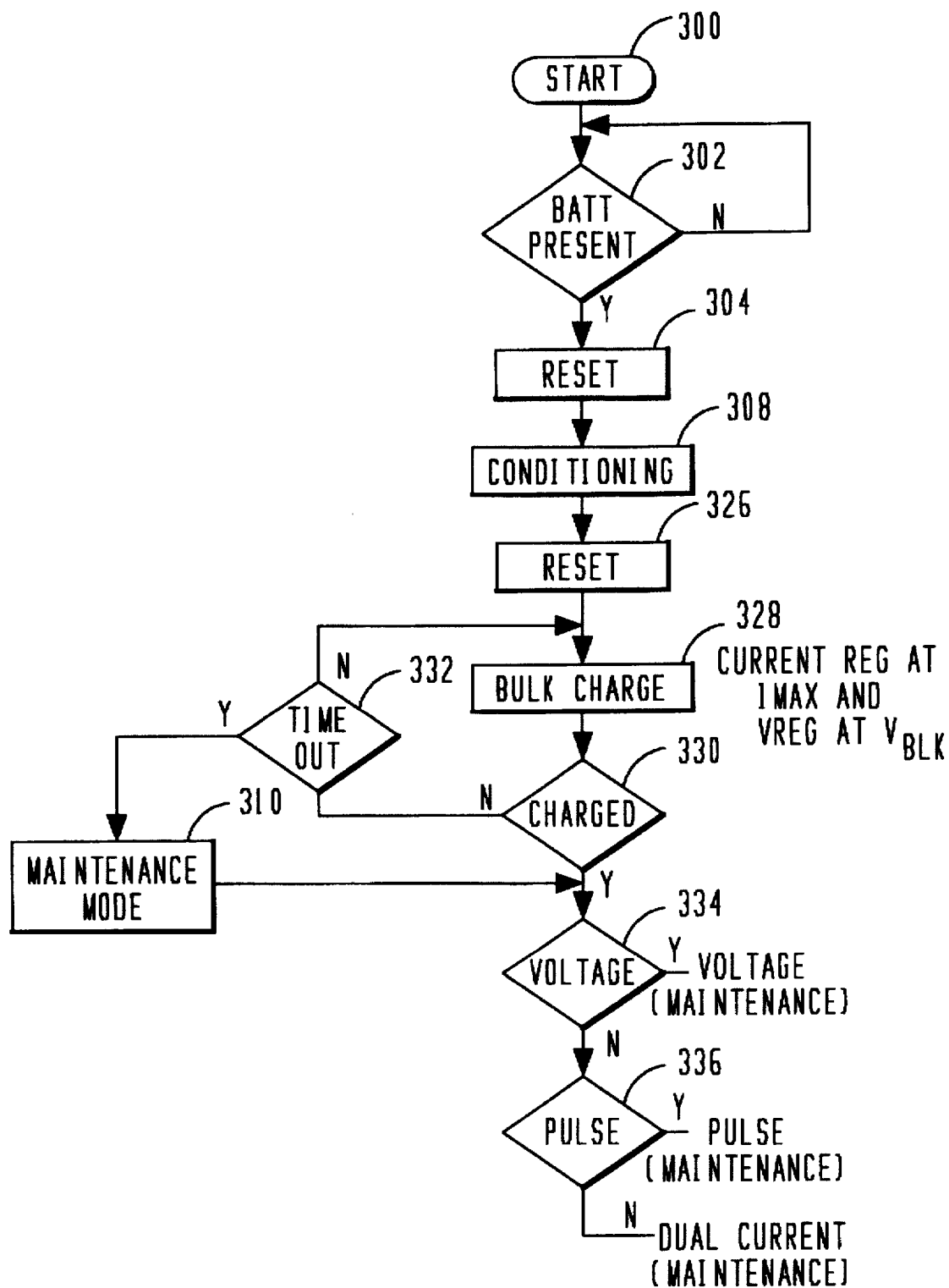
FIGS. 15–18 illustrate flowcharts for the overall operation of the state machine.

Referring now to FIG. 15, there is illustrated a flowchart depicting the overall operation of the system. The program is initiated at a start block 300 and then proceeds to a decision block 302 in order to determine whether the battery is present. In this mode, a decision is made as to whether there is a voltage present at the battery terminal. If not, the program flows back to the input of decision block 302 in order to awake a valid voltage. When this occurs, the program flows along the "Y" path to a reset block 304 to initialize the system. The program then flows to a function block 306 to initiate the conditioning algorithm described hereinabove with respect to FIG. 3a. When the conditioning algorithm determines that a battery is both present and the cell voltage has risen to or above $V_{MIN}$, the program will flow to a function block 326 to again reset the system. The program will then flow to a function block 328 to enter a bulk-charge state.

The program will flow to a decision block 330 to determine if the voltage of the battery is in a charge state. In the constant voltage mode, this indication is determined when the battery voltage is equal to a greater than $V_{BLK}$. In the dual or pulsed-current mode, this is determined when either the voltage is greater than or equal to $V_{BLK}$ or the gradient change method has determined that the battery is charged. If the battery has not been fully charged, the program will flow along the "N" path from decision block 330 to a time-out block 332, this being for a length of time equal to the MTO timer period. If the time-out period does not occur, the program will flow along the "N" path back to the input of function block 328. When the time-out period occurs, the program will flow along the "Y" path from the decision block 332 to a maintenance block 310. However, when the battery is fully charged, before the time-out, the program will flow from decision block 330 to a decision block 334 to determine if the constant voltage mode is the existing mode. If so, the program will flow along a "Y" path to a top-off and maintenance routine. If the vokage mode is not indicated, the program will flow along an "N" path from decision block 334 to a decision block 336. Decision block 336 determines whether the pulse mode is selected. If so, the program will flow along the "Y" path to a pulse and maintenance routine and, if not, the program will flow along a "N" path to a constant or dual current and maintenance program.

Figures 16, 18:
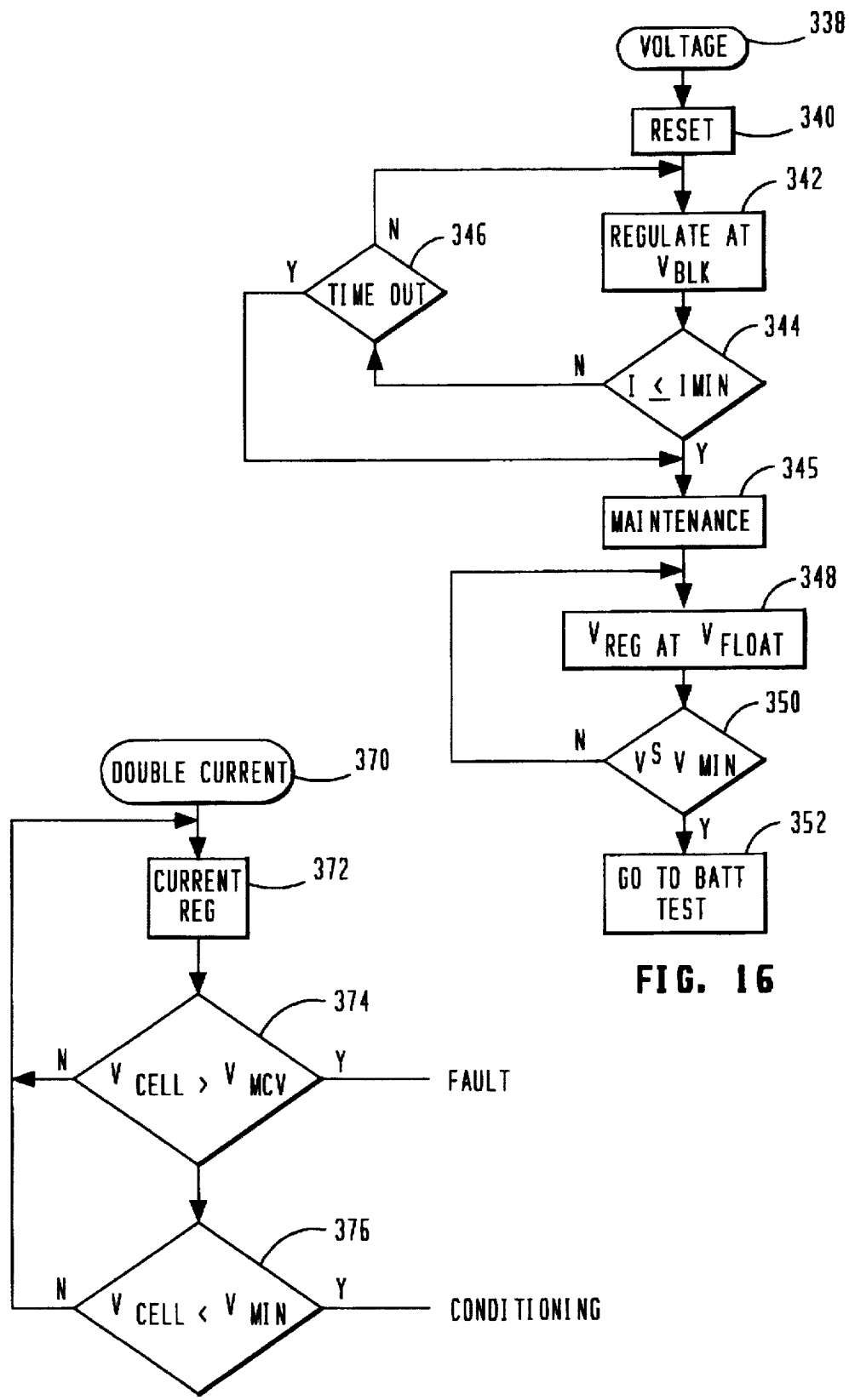

Referring now to FIG. 16, there is illustrated a flowchart depicting the constant voltage mode, which is initiated at a function block 338 and then proceeds to a function block 340 to perform a reset operation. The program then flows to a function block 342 for a reset operation of the MTO timer. The program then flows to a function block 342 wherein a voltage regulation mode is entered to regulate the voltage at a voltage of $V_{BLK}$. The program then flows to a decision block 344 to determine if the current is less than or equal to the current $I_{MIN}$. If not, the program flows along a "N" path to a decision block 346 to determine if a time-out period has occurred. The time-out period is the period of the MTO timer. If so, the program will flow along a "Y" path to a maintenance block 345 to enter the maintenance state. If not, the program will flow along the "N" path back to the input of function block 342. When the current is less than or equal to $I_{MIN}$, the program will flow along a "Y" path to the function block 345 to enter the maintenance state.

When the program has entered the maintenance state, the program will flow to a function block 348 to regulate the voltage at VFLOAT. The program will then flow to a decision block 350 to determine if the voltage is equal to or less than the voltage $V_{MIN}$. If not, the program will flow along the "N" path back to the input of function block 348 and remain in that state. If the voltage is determined to be less than or equal to $V_{MIN}$, this indicates that the battery has been removed and the program will flow along the "Y" path to a function block 352 indicating that the program should flow to battery test function block 306 of FIG. 15. This path will be present in all charge states except the conditioning state.

Figure 17:
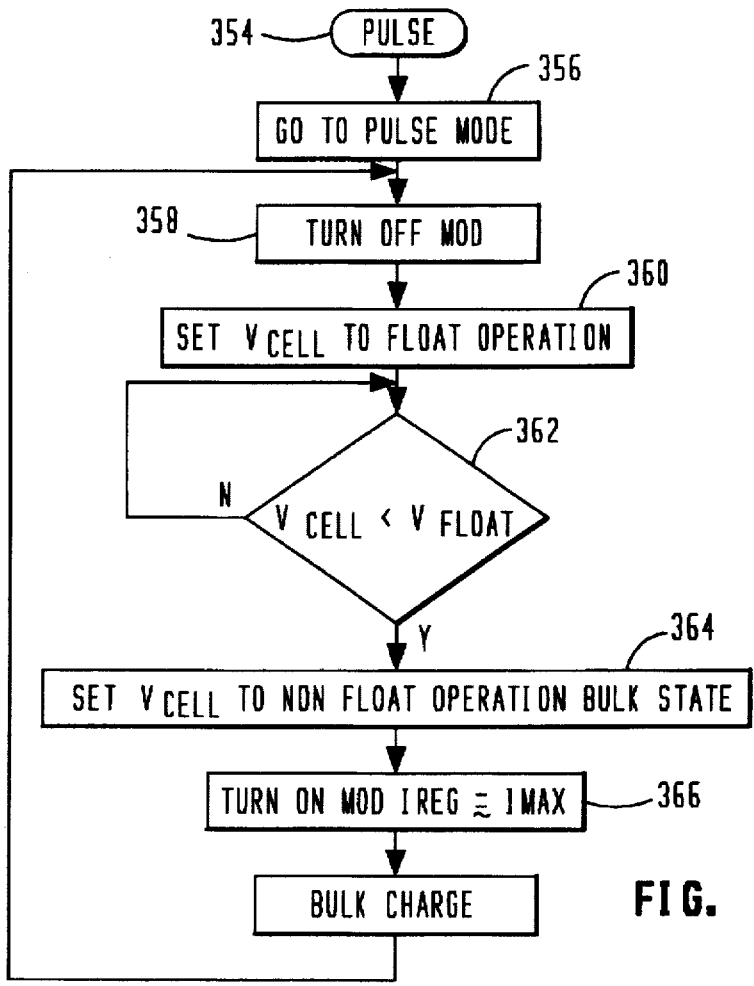

Referring now to FIG. 17, there is illustrated a flowchart depicting the pulse mode, which is initiated at a block 354 and then flows to a function block 356 to go the pulse mode of operation in the maintenance state. In the pulse mode of operation, the MOD is inhibited, as indicated by a function block 358. The program then flows to a function block 360 to set the cell float operation wherein no current is supplied to the cell. The program flows to a decision block 362 to determine if the voltage of the cell is less than VFLOAT. The program will flow along the "N" path until this occurs, at which time the program will flow along the "Y" path to a function block 364 to set the cell voltage to operate in a non-float operation, i.e., go back to the constant current bulk mode operation, as indicated by a function block 368. It is noted that, in the pulse mode, charging is determined upon either $V_{CELL}$ being greater than or equal to $V_{BLK}$ or termination has been determined by the voltage gradient change method. Of course, the MTO time-out will also cause a termination.

Referring now to FIG. 18, there is illustrated a flowchart depicting a dual current operation, which is initiated at a block 370 and then proceeds to a function block 372 to enter a current regulation mode, wherein the current is stepped down in a pulsed current regulation mode and then proceeds to a decision block 374 to determine if the cell voltage is either greater than the maximum cell voltage $V_{MCV}$. If so, the program flows to a fault operation. If not, the program flows to a decision block 376 to determine if the cell voltage is less than the minimum cell voltage $V_{MIN}$, at which time the program will flow to the conditioning operation. If not, the program maintains the current regulation mode at the maintenance state. The decisions in the blocks 374 and 376 are present in all states except the conditioning state.

Figure 19:
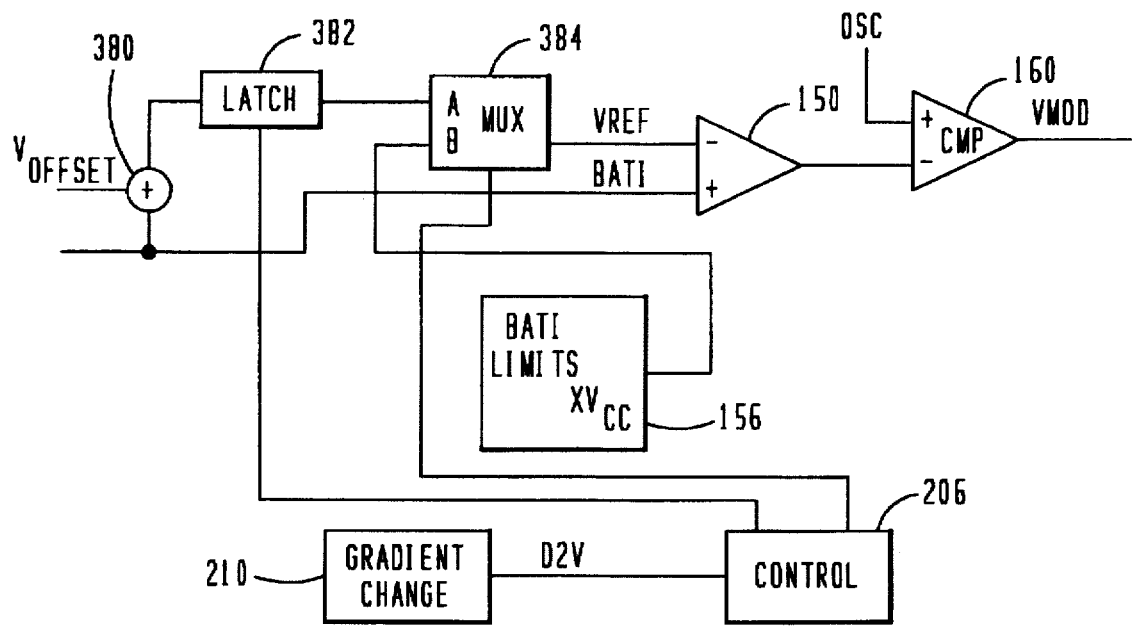
FIG. 19 illustrates an alternate embodiment of the present invention.

Referring now to FIG. 19, there is illustrated an alternate embodiment of the present invention. In the voltage regulation mode, the alternate embodiment utilizes the gradient change method to determine when to terminate the current regulation operation for the constant-voltage mode charging profile, described hereinabove with respect to FIG. 3. In the above described mode, the decision to change from current regulation to voltage regulation between the bulk and top-off states was made based upon the voltage reaching the $V_{BLK}$ voltage level. However, it may be possible that this would result in overcharging the battery. The alternate embodiment is to utilize the gradient change method to determine the voltage at which the battery is at a substantially charged state or within at least 80–90% of its fully charged state. At this point, the voltage at which the gradient change method determined that the charging operation should be terminated in the current regulation mode is utilized as the voltage for the voltage regulation mode in the top-off portion of the charge action state.

Referring further to FIG. 19, the BATI voltage on line 152 is input through a summing circuit 380 to a latch 382. The summing circuit 380 adds an offset voltage $V_{OFFSET}$ to the voltage on BATL This voltage is latched in the latch 382 in response to the gradient change block 210 determining that a charge altering operation should occur. The output of the latch 382 is input to one input of a two input multiplexer 384, the other input thereof connected to the X $V_{CC}$ output of battery limit circuit 156. The multiplexer 384 is operable, therefore, to select either the voltage on the latch 382 or the X $V_{CC}$ voltage on the output of the battery limit circuit 156. This allows the system to make two decisions. The decision is basically that, if the voltage $V_{BLK}$ is reached prior to the gradient change occurring, as determined by the block 210, then the voltage regulator will operate at the X $V_{CC}$ voltage. If, however, the gradient change method determines that the gradient change has occurred prior to the voltage of the battery reaching the $V_{BLK}$ voltage level, then the voltage at which the gradient change occurred will be latched into the latch 382 with the offset voltage and this utilized to control the voltage regulation operation.

Figure 20:
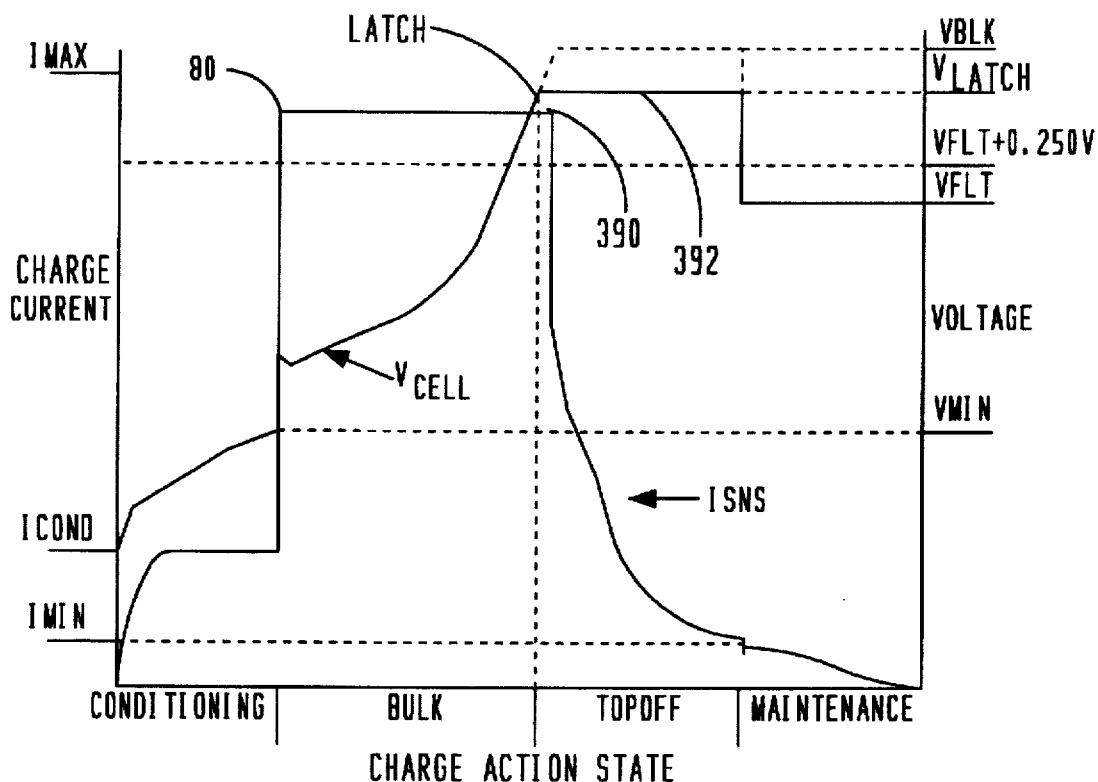
FIG. 20 illustrates a charge profile for this operation.

Referring to FIG. 20, there is illustrated a charge profile for this operation. It can be seen that the decision to latch the voltage is made at a point 390 and the voltage regulated at a level $V_{LATCH}$ at a level 392. Thereafter, the operation will proceed in a normal manner. It is noted that this level is approximately eight percent of full charge. The offset raises this voltage level to achieve a higher charge state.

Figure 21:
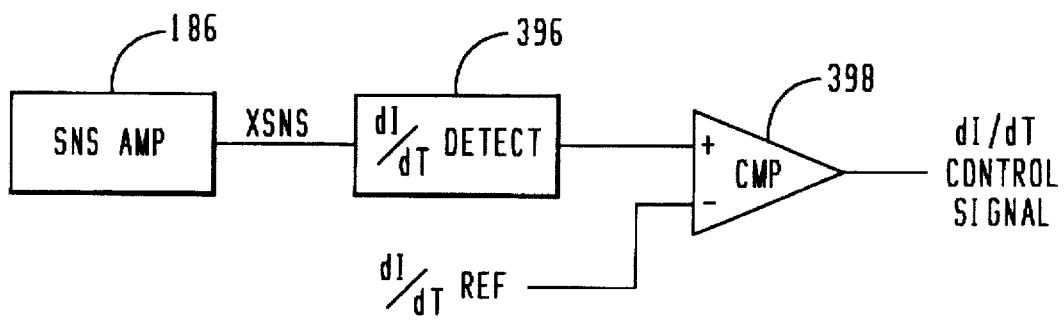
FIGS. 21 and 21a illustrate an alternate embodiment wherein termination of the top-off mode will be determined based upon a decision as to whether the change in the current is a function of time or the first derivative.
Figure 21A:
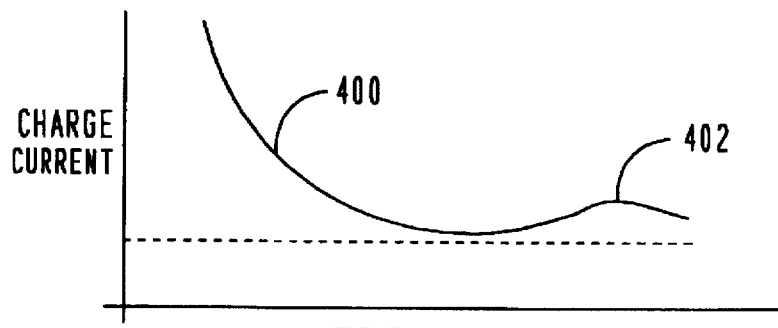

Referring now to FIG. 21, there is illustrated an alternate embodiment wherein termination of the top-off mode will be determined based upon a decision as to whether the change in the current as a function of time, or the first derivative, is determined based upon a decision as to whether the change in the current as a function of the time or the first derivative dI/dt is less than a predetermined level, or it goes positive. This is illustrated in the curve of FIG. 21a. The sense amp 186 outputs the XSNS signal to a dI/dt detect circuit 396, the output thereof input to one input of a comparator 398. The other input of the comparator 398 is connected to a reference voltage. Whenever the dI/dt detect circuit output rises above a predetermined negative value, a dI/dt signal is generated which terminates the top-off operation. Additionally, if the current falls below the current $I_{MIN}$, this will also terminate the top-off operation and switch to the maintenance mode. This is illustrated by a point 400 on the curve in FIG. 21a for the portion of the charging profile illustrated between the top-off and maintenance modes. Additionally, an alternate method is to detect when the first derivative goes positive, indicating an increase in current. This occurs at a point 402. This typically occurs in a lead acid battery under voltage regulation. Either of these points can be utilized to control the termination of the top-off mode and initiation of the maintenance mode.

In summary, there has been provided a multi-mode lead acid charger which provides a double loop pulse switching operation to provide current to the lead acid battery. In one mode, the loop provides for voltage regulation with a switched mode regulator, and in another mode, provides current regulation via a switched mode regulator. The multiple modes provide for a conditioning state to perform some conditioning on the battery prior to fast charging, a bulk charge state wherein the battery is rapidly charged up to a charged state and a maintenance state wherein self-discharge is accounted for. In the bulk charge state, a number of techniques are provided. In one technique, current regulation is performed to rapidly charge up the battery to a bulk voltage level, at which time the charging circuit is switched over to a vokage regulation mode until the current decreases to a minimum current level, at which time the state is switched to the maintenance state. In another mode, the bulk charging state is performed at maximum current via current regulation until the voltage is equal to or exceeds the bulk voltage level, at which time the current is dropped. In a third mode, current is pulsed in a manner that utilizes current regulation to rapidly charge the battery up to a charged state and then allow it to "float" until it reaches a nominal cell voltage level, at which time it is again raised up to the charged state via current regulation. A determination is made as to the charged condition by determining if the second derivative of the battery voltage as a function of time has a defined accumulated negative value for a predetermined amount of time. This indicates a rise in temperature and also a rise in pressure within the battery.

Although the preferred embodiment has been described in detail, it should be understood that various changes, substitutions and alterations can be made therein without departing from the spirit and scope of the invention as defined by the appended claims.

What is claimed is:

1. A charge control circuit for controlling a charging operation of a lead acid battery, comprising:

a charging device having an input connected to an external power supply source and an output connected to the positive terminal of the battery and controllable to determine the amount of charge input to the battery;

a control system for controlling said charging device during a charging operation, at least a portion of the charging operation being a fast charge operation;

a voltage monitor for monitoring the voltage across the battery;

a determination device for determining when a change in battery voltage as determined by said voltage monitor as a function of time decreases during at least said fast charge operation by a predetermined amount in a continuous manner from the point at which the decrease is initiated to the point at which the decrease is greater than the predetermined amount, and generating a charge modification command in response thereto; and said control system having a charge modification device for altering the operation of said charging device in response to generation of said charge modification command.

2. The charge control circuit of claim 1, wherein said determination device is operable to determine when the slope of the change in voltage of the battery is negative for a predetermined accumulated voltage value with no positive change during said predetermined accumulated voltage value determination, said charge modification command generated in response to said change exceeding said predetermined accumulated voltage value.

3. The charge control circuit of claim 1, wherein said charging device comprises a switching regulator circuit.

4. The charge control circuit of claim 3, wherein said control system comprises:

a voltage regulator control for controlling said switching regulator circuit to provide current to the battery at a predetermined regulated voltage;

a current regulator control for controlling said switching regulator circuit to provide a regulated current to the battery; and a state machine for selecting either said voltage regulator control or said current regulator control to control said switching regulator circuit in accordance with a predetermined charge profile for defining the operation of said charging device.

5. The charge control circuit of claim 4, and further comprising a plurality of predetermined charge profiles, each different, and a configuration device for configuring said state machine to operate on only one of said predetermined charge profiles in response to a user selection thereof.

6. The charge control circuit of claim 4, wherein said predetermined charge profile comprises a conditioning state, a fast charge state and a maintenance state.

7. The charge control circuit of claim 6, and further comprising a current sensor for measuring the current to the battery from said charging device.

8. The charge control circuit of claim 7, and further comprising a current threshold register for storing current threshold information for use by said state machine.

9. The charge control circuit of claim 8, and further comprising a battery presence detector for detecting if current is flowing to said battery during said conditioning state when a voltage is applied thereacross and, if not, generating a battery fail signal.

10. The charge circuit of claim 9, and further comprising a timing circuit for determining if a predetermined amount of time has elapsed from beginning of operation in said conditioning state during the operation of said battery presence detector and, if said predetermined amount of time has elapsed prior to said battery presence detector determining if current is flowing, said state machine switching to a fault state to inhibit operation of said charging device and indicate a failure to a user.

11. The charge control circuit of claim 8, wherein said state machine in said conditioning state is operable to select said current regulator control and regulate current to a conditioning current level, and switch from said conditioning state to said fast charge state when the sensed voltage of the battery rises above a predetermined minimum cell voltage.

12. The charge control circuit of claim 11, and further comprising, a timing circuit for determining if a predetermined amount of time has elapsed from beginning of operation in said conditioning state and regulation at said conditioning current level, and, if said predetermined amount of time has prior to the voltage of the battery rising above the minimum cell voltage, said state machine switching to a fault state to inhibit operation of said charging device and indicate a failure to a user.

13. The charge control circuit of claim 8, wherein said state machine in said fast charge state is operable to select said current regulator control and regulate the current to the battery at a predetermined maximum current, and select said voltage regulator control to regulate the voltage of the battery at a predetermined bulk voltage level when the voltage of the battery as sensed by said voltage monitor rises above said predetermined bulk voltage level, said state machine controlling said switching regulator to operate in the maintenance state when the current to the battery when under control of said voltage regulator control falls below a minimum current level.

14. The charge control circuit of claim 13, and further comprising an announcement circuit for determining when the voltage of the battery is within a predetermined percentage of said predetermined bulk voltage level and announcing to the user that such condition has occurred.

15. The charge control circuit of claim 13, and further comprising a timer for generating an elapsed time from the beginning of said fast charge state, and, if the voltage level of the battery has not reached the predetermined bulk voltage level during operation under said current regulator control before a predetermined amount of said elapsed time, said state machine switches to the maintenance state.

16. The charge control circuit of claim 15, wherein said timer is reset when said switching regulator circuit is controlled by said voltage regulator control and said timer generates an elapsed time from said reset, and if the current to the battery has not fallen below said minimum current level when operating under the control of said voltage regulator control before a predetermined amount of said elapsed time, said state machine switches to the maintenance state.

17. The charge control circuit of claim 8, wherein said state machine operates in the maintenance state selecting said voltage regulator control to regulate the voltage of the battery to a predetermined float voltage that is at a lower level than said predetermined bulk voltage level.

18. The charge control circuit of claim 17, wherein said float voltage level is substantially equal to the rated cell voltage level of the battery.

19. The charge control circuit of claim 8, wherein said state machine in said fast charge state is operable to select said current regulator control and regulate the current to the battery at a predetermined maximum current and switch to said maintenance state upon generation of said charge modification command.

20. The charge control circuit of claim 19, wherein said state machine in said maintenance mode is operable to inhibit operation of said switching regulator circuit, and switch from said maintenance state to said fast charge state when the battery voltage fails below a predetermined float voltage which is lower than a predetermined bulk voltage level, said bulk voltage level being at the substantially rated maximum for the battery.

21. The charge control circuit of claim 19, and further comprising a timer for measuring an elapsed time from the beginning of said fast charge state, and, if said charge modification command has not been generated prior to a predetermined amount of said elapsed time, switching to said maintenance state.

22. The charge control circuit of claim 8, wherein said state machine in said maintenance state is operable to select said current regulator control and regulate the current to the battery at a predetermined minimum current level by pulsing the operation of said switching regulator circuit with pulses to regulate the current level at a conditioning level higher than the minimum current level for a predetermined duration of time for each of the pulses such that the average current is equal to the minimum current level.

23. The charge control circuit of claim 8, wherein said state machine in said fast charge state is operable to select said current regulator control and regulate the current to the battery at a predetermined maximum current and select said voltage regulator control to regulate the voltage of the battery when said charge modification command is generated, and switching to a maintenance state when the current to the battery when under control of said voltage regulator control meets a predetermined current state.

24. The charge control circuit of claim 23, wherein said predetermined current state occurs when the current to the battery when under control of said voltage regulator control falls below a minimum level.

25. The charge control circuit of claim 23, wherein said predetermined current state is determined by a current first derivative detection circuit which determines when the first derivative of the current rises above a predetermined negative value when approaching a zero value.

26. The charge control circuit of claim 23, and further comprising a timer for generating an elapsed time from the beginning of said fast charge state, and, if the charge modification command has not been generated or if the voltage level of the battery has not reached a predetermined bulk voltage level during operation under said current regulator control before a predetermined amount of said elapsed time, said state machine switches to the maintenance state.

27. The charge control circuit of claim 26, wherein said timer is reset when said switching regulator circuit is controlled by said voltage regulator control and said timer generates an elapsed time from said reset, and if the current to the battery has not met said predetermined current state when operating under the control of said voltage regulator control before a predetermined amount of said elapsed time, said state machine switches to the maintenance state.

* * * * *